(12) United States Patent
Senarath et al.

(10) Patent No.: US 11,095,526 B2
(45) Date of Patent: Aug. 17, 2021

(54) SYSTEM AND METHOD FOR ACCELERATED PROVISION OF NETWORK SERVICES

(71) Applicants: Nimal Gamini Senarath, Ottawa (CA); Jaya Rao, Ottawa (CA)

(72) Inventors: Nimal Gamini Senarath, Ottawa (CA); Jaya Rao, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 178 days.

(21) Appl. No.: 15/809,562

(22) Filed: Nov. 10, 2017

(65) Prior Publication Data

US 2018/0139106 A1    May 17, 2018

Related U.S. Application Data

(60) Provisional application No. 62/421,801, filed on Nov. 14, 2016.

(51) Int. Cl.
*H04L 12/24* (2006.01)
*H04L 29/08* (2006.01)

(52) U.S. Cl.
CPC .......... *H04L 41/147* (2013.01); *H04L 41/145* (2013.01); *H04L 67/16* (2013.01)

(58) Field of Classification Search
CPC .................................................. H04L 41/147
See application file for complete search history.

(56) References Cited

U.S. PATENT DOCUMENTS

| | | | | |
|---|---|---|---|---|
| 8,898,763 | B1 * | 11/2014 | Mannepalli | H04L 63/10 726/6 |
| 10,158,727 | B1 * | 12/2018 | Mukhopadhyaya | H04L 67/16 |
| 10,409,649 | B1 * | 9/2019 | Young | G06F 9/5083 |

(Continued)

FOREIGN PATENT DOCUMENTS

| | | |
|---|---|---|
| CN | 101202765 A | 6/2008 |
| CN | 101860944 A | 10/2010 |

(Continued)

OTHER PUBLICATIONS

International Search Report dated Feb. 1, 2018 for corresponding International Application No. PCT/CN2017/110877 filed Nov. 14, 2017.

(Continued)

*Primary Examiner* — Andrew C Georgandellis

(57) ABSTRACT

The present application provides a system and method for accelerated network service and/or network slice provisioning in response to customer requests or requirements. The provided system and method incorporate a network service/network slice instance that is responsible for constructing and maintaining status and models associated with the dynamics of network services. A modelling function can be operated based on collected network service information to maintain a model relating to network service dynamics, and transmit indications, such as predictions of future requirements, to a corresponding network management service. The indications can be used for creation, modification, and termination of the network service, or for advanced preparation of such actions.

27 Claims, 12 Drawing Sheets

(56) References Cited

U.S. PATENT DOCUMENTS

| | | | | |
|---|---|---|---|---|
| 2007/0083588 A1* | 4/2007 | Keller | ............... | H04L 69/40 |
| | | | | 709/202 |
| 2011/0214009 A1* | 9/2011 | Aggarwal | ............ | G06Q 10/063 |
| | | | | 714/4.11 |
| 2013/0036226 A1* | 2/2013 | Anderson | ............ | G06F 9/5072 |
| | | | | 709/226 |
| 2015/0381515 A1* | 12/2015 | Mattson | ................ | H04L 47/70 |
| | | | | 707/609 |

FOREIGN PATENT DOCUMENTS

| | | |
|---|---|---|
| CN | 103491556 A | 1/2014 |
| CN | 105207812 A | 12/2015 |

OTHER PUBLICATIONS

3GPP TSG SA WG5 Discussion of Network Slicing and ETSI NFV Service Relationship. Cisco Systems Jul. 15, 2016.
3GPP TR 22.891 entitled "Study on New Services and Markets Technology Enablers," Release 14, Version 1.2.0, Jan. 20, 2016.

* cited by examiner

SYSTEM AND METHOD FOR ACCELERATED PROVISION OF NETWORK SERVICES

CROSS-REFERENCE TO RELATED APPLICATIONS

The present application claims priority from U.S. Provisional Patent Application No. 62/421,801, filed on Nov. 14, 2016, and which is incorporated herein by reference in its entirety.

FIELD OF THE INVENTION

The present application pertains to the field of communication networks. More particularly, the present application relates to a system and method for providing network services.

BACKGROUND

Communication networks enabled by technologies such as Network Function Virtualization (NFV), and Software Defined Networking (SDN), may be flexibly organized so as to service various customer demands. In building advanced networks, such as those to support future developments in wireless networks (including next generation wireless, or 5th generation networks), network slicing provides the ability to create isolated virtual networks that can be used to independently manage different traffic flows over a network. However, providing network services, whether using a network slice or not, involves managing variable and competing demands on a potentially large network scale. This is a complex proposition requiring an effective architecture and management thereof.

There remains a need for a system and method for timely provisioning of new or modified services, while minimizing unnecessary use of network resources.

This background information is provided to reveal information believed by the applicant to be of possible relevance to the present invention. No admission is necessarily intended, nor should be construed, that any of the preceding information constitutes prior art against the present invention.

SUMMARY

In a first aspect of the present invention, there is provided a system for providing a service in a communications network, comprising a network service/network slice instance (NS/NSI) modeling function, in communication with a network management service (NMS), configured to direct underlying resources for collecting and maintaining information relating to network service dynamics and for transmitting the information relating to network service dynamics to the NMS for use in creation modification or termination of services.

In a second aspect of the present invention, there is provided a system for providing a service in a communications network, comprising a network management service (NMS), in communication with a network service/network slice instance (NS/NSI) modeling function, and configured to direct underlying resources for creation, modification or termination of services within the communications network using the information regarding network service dynamics received from the NS/NSI modeling function.

In a third aspect of the present invention, there is provided a network service/network slice instance (NS/NSI) modeling function comprising a computer processor having a memory and a network interface, wherein the NS/NSI modeling function is configured to direct underlying resources for collecting and maintaining information relating to network service dynamics and for communicating the information relating to network service dynamics to a network management system within a communications network.

In a fourth aspect of the present invention, there is provided method for creating or modifying a service in a communications network, comprising: instantiating or modifying, by a network management service (NMS), a network service/network slice instance (NS/NSI) within the communications network by: determining a need for a new NS/NSI or a modified NS/NSI; receiving from a NS/NSI modeling function information regarding network service dynamics for the new NS/NSI or a modified NS/NSI; and pre-allocating resources, using the information received from the NS/NSI modeling function, for creating the new NS/NSI or a modified NS/NSI.

In a fifth aspect of the present invention there is a computer platform having a network interface, a processor and a memory storing instruction that when executed by the processor cause the computing platform to carry out the methods of the fourth aspect.

According to another aspect of the present invention, there is provided a modeling function operating in a communication network. The modeling function includes a processor, a memory, and a network interface. The modelling function is configured to collect, using the network interface, input information relating to a network service. The modelling function is further configured to maintain, using the processor and the memory, modeled information relating to network service dynamics. The modeled information is maintained based on a computational model incorporating the input information. The modelling function is further configured to transmit, using the network interface, the modeled information to a network management service (NMS) operating in the communication network, for use in one or more of: creation, modification, and termination of the network service. The modeled information may be an explicit request for the NMS to perform an action, or information based on which the NMS can determine an action to perform and a time to perform the action.

According to another aspect of the present invention, there is provided a network management service (NMS) operating in a communication network. The NMS includes a processor, a memory, and a network interface. The NMS is configured to receive, using the network interface, modeled information from a modeling function. The modeled information relates to network service dynamics. The network service dynamics may include dynamics of a network service managed by the NMS. The network service dynamics may include dynamics related to the network infrastructure's capability to support the network service. The NMS is further configured to direct, using the processor, the memory and the network interface, underlying resources to create, modify or terminate, or to prepare to create, modify or terminate the network service within the communications network, using the modeled information.

According to another aspect of the present invention, there is provided a system comprising: a NMS as described above and a modeling function as described above, the NMS operatively coupled together.

According to another aspect of the present invention, there is provided a method, in a communication network. The method includes collecting, using a modeling function operating in the communication network, input information relating to a network service provided by the communication network. The method further includes maintaining, using the modeling function, modeled information relating to network service dynamics, the modeled information maintained based on a computational model incorporating the input information. The method further includes transmitting, using the modeling function, the modeled information to a network management service (NMS) operating in the communication network, for use in one or more of: creation, modification, and termination of the network service.

According to another aspect of the present invention, there is provided a method, in a communication network. The method includes receiving, at a network management service (NMS), modeled information from a modeling function, the modeled information relating to network service dynamics of a network service managed by the NMS, of the network's capability to support the network service, or both. The method further includes directing, by the NMS, underlying resources to create, modify or terminate, or to prepare to create, modify or terminate the network service within the communications network, using the modeled information.

BRIEF DESCRIPTION OF THE FIGURES

Further features and advantages of the present invention will become apparent from the following detailed description, taken in combination with the appended drawing, in which.

DETAILED DESCRIPTION

Figure 1:
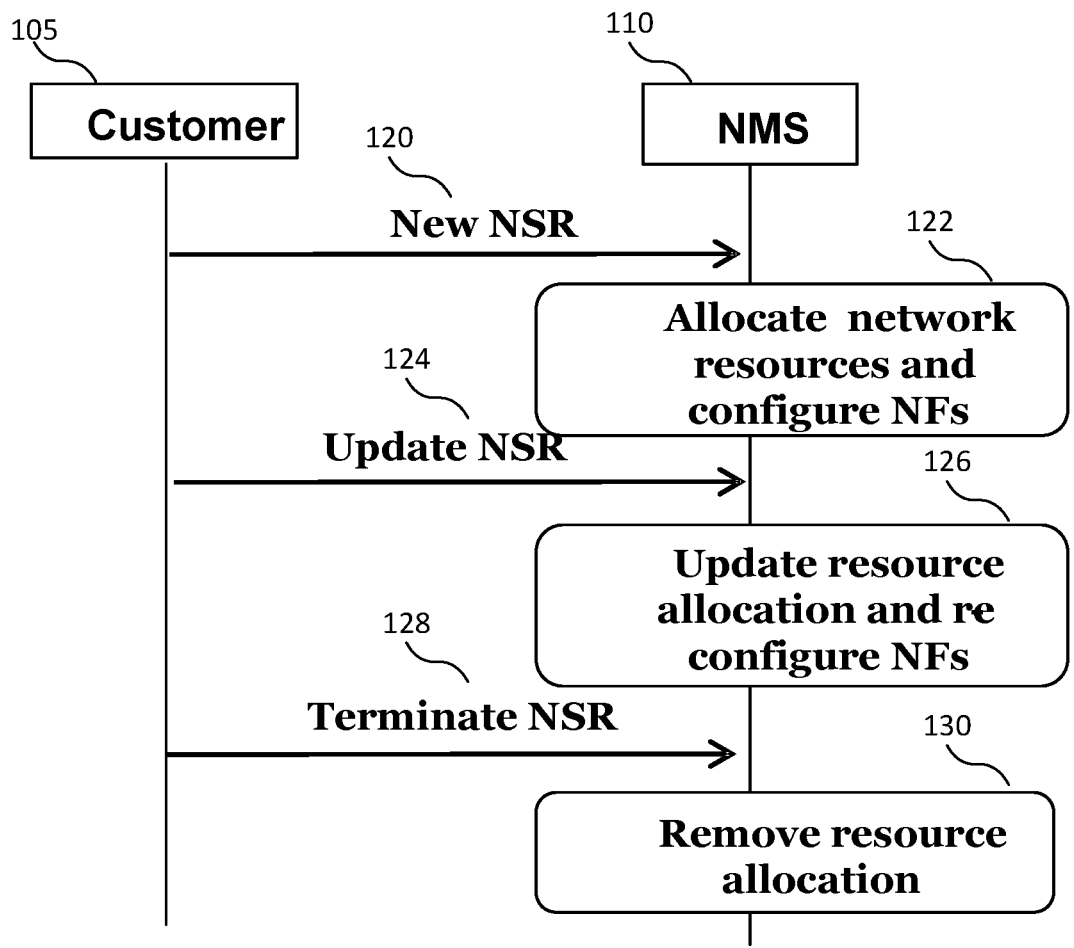
FIG. 1 is a signalling diagram illustrating a prior art process for network slice/service provisioning.

Various acronyms as used herein are defined in the following non-exhaustive list:

MANO: Management and Orchestration
MNO: Mobile Network Operator
NF: Network Function
NFV: Network Function Virtualization
NMS: Network Management System
NS: Network Service
NSI: Network Slice Instance
NSR: Network Service Request
QoE: Quality of Experience
QoS: Quality of Service
QCI: QoS Control Indicator
RAN: Radio access network
UE: User Equipment
UP: User Plane
VN: Virtual Network
VNF: Virtual Network Function Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

As used herein, a "network" or "communication network" may serve various devices including but not necessarily limited to wireless devices. Such a network may include a radio access portion and a backhaul portion. The network may further comprise various virtualized components as will become readily apparent herein. One such example of a network is a so-called Fifth Generation (5G) network. It has been proposed that the core networks employed by 5G networks be built with various network technologies that allow for the core network to be reconfigured to suit various different needs. These technologies can also allow the network to support network slicing to create isolated sub-networks with characteristics suited for the needs of the traffic that they are designed to support. The network may include a number of computing hardware resources that provide processors, memory, and storage to functions executing on the network, as well as a variety of different network connectivity options connecting the computing resources to each other, and making it possible to provide service to mobile devices. The term "mobile device" should be understood to refer to a device that connects to a mobile network, and should not be understood as requiring that the device itself be mobile. Mobile networks are those that make use of wireless communication channels to enable connected to devices to be connected to the network while supporting mobility. One example of a mobile device is the User Equipment (UE) as defined by the Third Generation Partnership Project (3GPP), which may include both handsets and other devices, including machine-to-machine (M2M) devices (also referred to as machine type communications (MTC) devices).

As used herein, "network slicing" refers to a technique for creating virtual networks that separate different types of network traffic, and which can be used in reconfigurable network architectures such as networks employing network function virtualization (NFV). A network slice (as defined in 3GPP TR 22.891 entitled "Study on New Services and Markets Technology Enablers," Release 14, Version 1.2.0, Jan. 20, 2016) is composed of a collection of logical network functions that supports communication service requirements of particular use cases. One use of network slicing is within the core network of a communications network architecture. Through the use of network slicing, different types of network traffic can be placed in distinct virtual networks running on the same physical set of computing resources as other slices. Each VN can be designed the meet the specific needs of the traffic that it carries. This can allow a single network operator to support different services or even different service providers. It should be understood that this discussion is not intended to exclude the application of network slicing as it applies to the radio access edge of the radio access network (RAN), which may need specific functionality to support multiple network slices or partitioning of resources for different network slices. In order to provide performance guarantees, the network slices can be isolated from each other so that traffic, storage and processing demands in one slice do not negatively affect the other slices. The isolation is not restricted to different types of services. A network operator can create different network slices to accommodate different services, or a slice can be created to accommodate a number of services that have similar traffic profiles and requirements. By allowing further differentiation of traffic within a slice, such as by the use of service identifiers, the overall number of slices can be reduced to minimize the overhead requirements.

Network slicing allows the instantiation of separate network slices respectively directed toward different network services. This allows for separation of different types of traffic which may have different packet processing requirements and QoS requirements. The pooled resources may be commercial-off-the-shelf hardware components capable of configuration through virtualization approaches, such as NFV, in order to support various network functionalities for supporting the operations of the network slices.

The capabilities and operating parameters of each network slice may be customized to the service requirements. Configuration of the network slices may include defining a plurality of virtualized network functions, using network function virtualization techniques, on compute resources from data centers; and defining logical links between the VNFs. These configuration operations may make use of SDN techniques and controllers as well as MANO functions.

A portion of communication network resources may be allocated for use by a network slice. These resources can include radio access communication resources and other communication resources in wired and wireless environments, computational resources, and memory and other storage resources. Resources may further include network infrastructure resources such as management plane resources, control plane resources, and data plane resources. Resources may include hardware resources, such as portions of computer processing capabilities, or communication resources, such as portions of communication links partitioned by time, frequency, spreading code, or a combination thereof. Nodes in the same network slice may be connected by logical connections, which can be thought of as overlaying physical connections.

Each Mobile Network Operator (MNO) may create a customised set of network slices using physical and/or virtualised network functions to meet their business and service needs. In some instances, a network slice may be pre-configured; in other instances, a network slice may be dynamically commissioned or re-configured to meet dynamically changing traffic demands.

The present application provides a system and method for accelerated network service and/or network slice provisioning in response to customer requests or requirements.

When a customer (such as, for example, a third party network service provider or an emergency services provider) submits a network service request (NSR) to the network management system (NMS), adequately provisioning of resources should be performed to allow for the deployment of the service (i.e., generally, a service includes a set of network functions and data forwarding links) within a specified setup time. The NSRs may arrive at the NMS in an ad-hoc manner and each NSR (which may be a new NSR request or an update NSR request) can consist of specific requirements (including, for example, space-time load level, QoS, QoE) which can be satisfied by: (i) commissioning a new network slice instance (NSI) for the requested network service (NS); (ii) deploying the NS within an existing NSI; or (iii) modifying a pre-existing NS on an existing NSI.

Depending on the network service requirements, the tasks required for NS provisioning may involve numerous and complex steps, each of which can range from few seconds to tens of minutes. This can significantly affect the overall service setup duration. Also, the setup duration may be dependent on the order in which the NSRs arrive, the type of network resources available, technology level of the network elements, etc.

Some embodiments of the present invention facilitate NS setup within a required time period, in all scenarios, irrespective of variations in NSRs.

A network service request (NSR) can be generally represented as a forwarding graph consisting of a set of network elements composed of network functions (NFs) and forwarding links. Each of these network elements can in turn, be specified in terms of resource bounds (e.g., CPU, storage and bandwidth capacity) and QoS requirements. Additionally, there can also be load requirements, which can vary geographically and temporally as well as end-to-end QoS/QoE requirements.

Generally, the tasks related to service provisioning involves service admission control, charging, designing/selecting/modifying a network slice instance, configuring the network management functions with service specific parameters, instantiating/activating the NFs and configuring the forwarding rules in the traffic routing functions. This can be broken down into four basic steps for each provision of a service: installation, instantiation, configuration and, optionally, modification. Each step in the service provisioning process introduces delays that can range from a few seconds to tens of minutes. This is also the case when certain existing services require to be modified to satisfy new requirements. This can result in re-configuration the existing network slice instance on which the network service is currently hosted. Depending on the technology available to the NMS (e.g. DC, MEC) and management related signaling delays involved, these delays may not be acceptable for certain services. As will be readily understood by a worker skilled in the art, DC stands for Data Center and MEC stands for Mobile Edge Computing.

As depicted in FIG. 1, currently existing procedures for network service/slice dimensioning and provisioning generally follow a reactive approach. That is, the NMS uses management tools and functions to allocate adequate resources and configure the network elements according to the NSR requirements, such as, load characteristics, traffic type and QoS metrics. The management tools and functions employed by the NMS include the network manager, domain manager, element manager and NFV-MANO (in the case where virtualized NFs are required).

In existing networks, modification of network provisioning is typically a reactive procedure. The network elements are typically deployed and configured manually to match the NSR. The individual provisioning steps can be repeated each time an update NSR is submitted throughout the lifecycle of the network service. These steps can result in a long time duration for the setup, and may result in both the initial and update stages being of a relatively high complexity. Additionally, the delay incurred in recovering and reassigning the resources after the service is terminated can hinder the NMS from rapidly provisioning and supporting new NSs.

As is readily apparent from FIG. 1 in view of the present disclosure, an NMS 110 can receive various NSRs from a customer 105. The NSRs can be (or be interpreted as) new NSR requests 120, requests to update an existing NSR 124, and requests to terminate an existing NSR 128. The NMS 110 can allocate network resources and configure NFs 120 in response to the new NSR request 120, update resource allocations and reconfigure NFs 126 in response to the request to update an existing NSR 124, and remove resource allocations 130 in response to the request to terminate an existing NSR 128.

Figure 2:
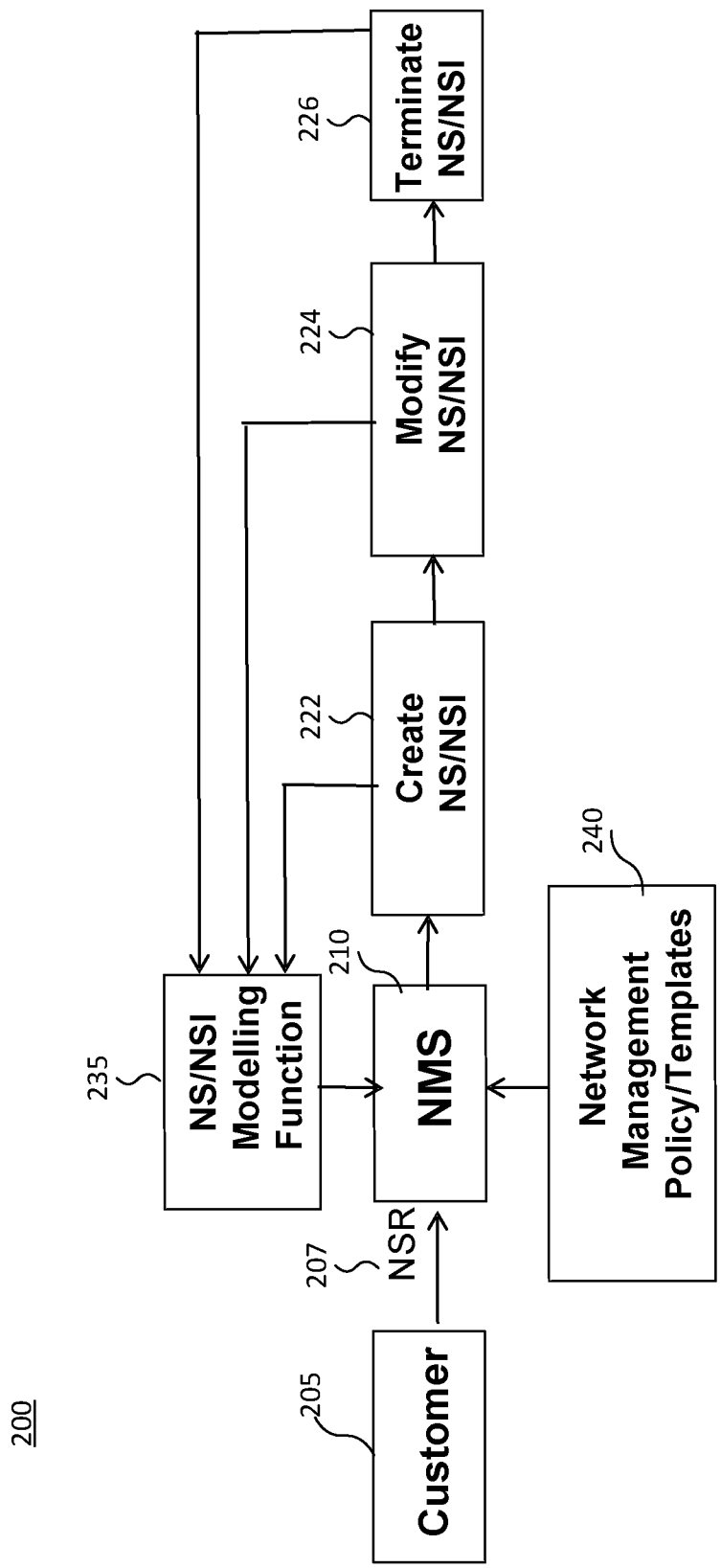
FIG. 2 is a schematic of the architecture of a system according to one embodiment of the present invention.

The present method and system mitigates at least one of the drawbacks associated with the current reactive approach to network service/slice dimensioning and provisioning. By making an NS/NSI Modelling Function available to the NMS, a degree of automation can be employed so that the complexity and long time scale for change implementation can be decreased. As shown in FIG. 2, embodiments of the present system incorporate an NMS 210, which can comprise a Network Manager, an Element Manager and a NFV-MANO. The NMS 210 is responsible for performing the lifecycle management of a network service/slice, in response to customer requests and network requirements. This may include the primary stages of creation 222, modification 224 and termination 226 of network services/slices and all associated network elements—NFs and forwarding paths. The disclosed illustrative system can employ a Network Management Policy/Templates function 240. This is a logical entity that maintains the network policies and templates required by the NMS to provision, configure, deploy and modify network elements throughout the lifecycle of a network service/slice. The NS/NSI Modeling Function 235 can be assigned responsibility for constructing and maintaining status and models associated with the dynamics of network services (e.g., using regression models). The NS/NSI Modeling Function 235 can be used to determine the existence of correlation between different network services (e.g., through any number of known techniques, such as k-means clustering algorithms) and it may be able to provide predictions that can be used to anticipate the behavior of network services based on the constructed models.

As is readily apparent from FIG. 2 in view of the present disclosure (which illustrates a system 200), the NMS 210 is responsive to NSRs 207 received from a customer 205. The NMS 210 is further configured to receive information from the Network Management Policy/Templates function 240, and to perform its operations in accordance with this received information. The NMS is further responsive to information relating to network service dynamics, such as notifications, received from the NS/NSI Modeling Function 235. The NMS 210 is further configured, for example in response to an NSR 207 and in accordance with the information from the Network Management Policy/Templates function 240, to create 222, modify 224 or terminate 226 an NS/NSI, in order to satisfy the NSR 207. The NMS 210 may determine which of the create 222, modify 224 or terminate 226 actions are appropriate in a given circumstance. Results of the create 222, modify 224 and terminate 226 operations are fed back to the NS/NSI Modeling Function 235. The NS/NSI Modeling Function 235 receives and uses this information to update its models associated with the dynamics of network services. As will become more apparent for example in view of FIG. 4A, the information relating to network service dynamics, provided by NS/NSI Modeling Function 235 to the NMS 210, can include predictions of NSR updates.

Figure 3:
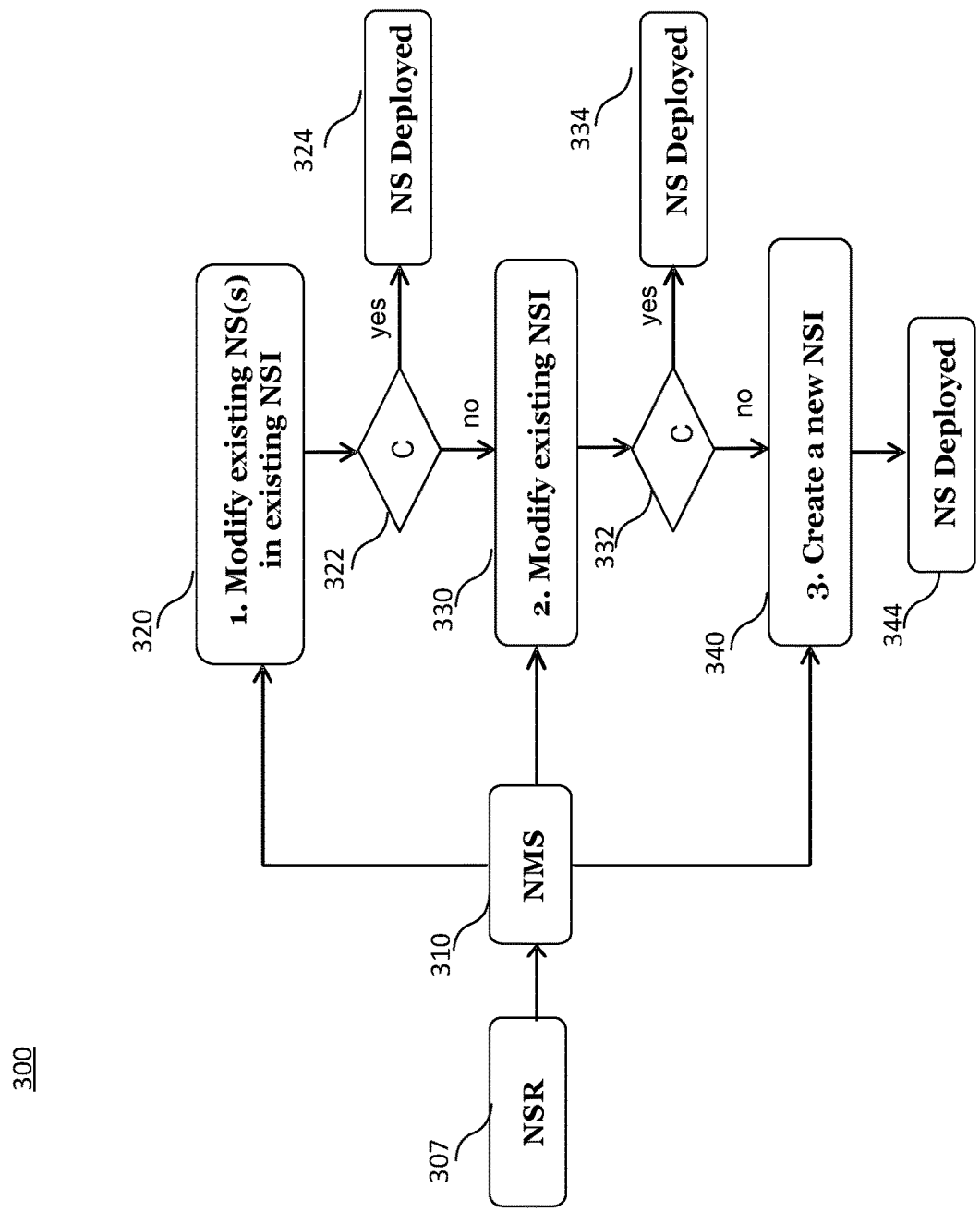
FIG. 3 is flowchart summarizing a process of network service/slice provisioning according to one embodiment of the present invention.

FIG. 3 depicts a process 300 of network service/slice provisioning in an NMS 310 according to an embodiment of the present invention. An NSR 307 is first received by the NMS 310. The requested network service can be categorized into 3 main classes, namely evolved mobile broadband (eMBB), ultra reliable and low latency communications (URLLC) and massive machine type communications (mMTC) based on traffic requirements, supported devices type and load characteristics. The NMS 310 can then determine if the received request will require any or all of (i) modification of an existing NS 320; (ii) modification of an existing NSI 330; and (iii) creation of a new NSI 340.

Modifying an existing NS 320 may include making modifications at the NF level (e.g., scaling of resources of VNFs (virtualized NF), modifying resource partitioning in PNF (physical NF), attaching an updated subscriber database, attaching new security/authorization entity). Alternatively, or in addition, modifying an existing NS 320 may include reassigning and retrofitting existing NFs from existing services to new services (e.g., transferring service related context from one NF to another). This modification may also include changing traffic steering rules, modifying traffic prioritization/de-prioritization at NFs and network routing elements. The expected setup delay associated with NS modification is low.

Modifying an existing NSI 330 may include retaining a subset of existing NFs in the NSI and adding new NFs to support the new services (e.g., the common control plane (CP) NFs can be retained while new and dedicated user plane (UP) NFs can be added). In another embodiment, the NFs in the NSI can be modified without requiring the addition of new NFs to support the services, while in another embodiment, no modification of existing NFs is required due to the addition of NFs. Alternatively, or in addition, modifying an existing NSI 330 may include making modifications at the common CP functions to support new services (e.g., adding association to subscriber databases of new services, adding association to external 3rd party functions to access the CP functions). The expected setup delay associated with NSI modification is medium.

Creating a new NSI 340 can include adding a new set of NFs (both CP and UP NFs) and new forwarding paths that are completely isolated from the exiting NSIs. The resources for the new NFs need to be allocated and the NFs need to be fully configured with all service related parameters. This alternative is mainly applicable for cases where high security (i.e., airgap) is necessary, where the traffic is routed over links and for NFs that do not come in contact with other traffic. The expected setup delay associated with NSI creation is high.

As is readily apparent from FIG. 3 in view of the present disclosure, the NMS 310 may be configured to make a determination 322 as to whether modifying one or more existing NSs in an existing NSI (320) can satisfy the NSR 307. If it is determined that modifying one or more existing NSs in an existing NSI (320) can satisfy the NSR 307, such a modification is done and the network service is deployed 324. The NMS 310 may also be configured to make a determination 332 as to whether modifying an existing NSI (330) can satisfy the NSR 307. If it is determined that modifying an existing NSI (330) can satisfy the NSR 307, such a modification is done and the network service is deployed 334. The above determinations 322, 332 can include determining whether it is possible to satisfy the NSR 307 in the considered manner, and whether the required actions can be performed in a timely manner, for example by a given deadline.

In various embodiments, the determination 322 is made first, and if it is determined that modifying one or more existing NSs in an existing NSI cannot satisfy the NSR 307, then the determination 332 is made next. If it is determined that modifying an existing NSI cannot satisfy the NSR 307, then a new NSI 340 for satisfying the NSR 307 is created and deployed 344.

Figure 4A:
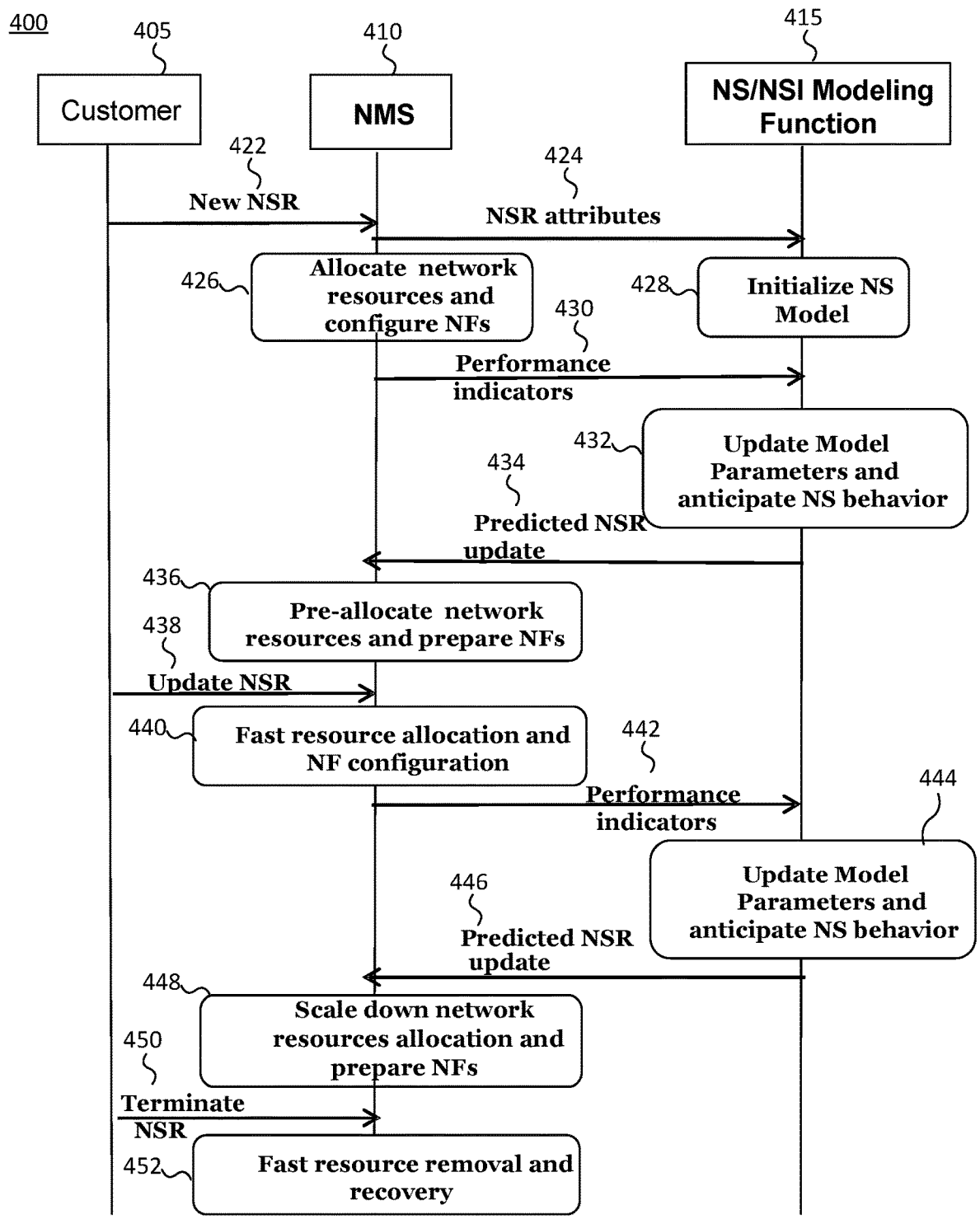
FIG. 4A is a signalling diagram summarizing a procedure for achieving accelerated network service/slice provisioning according to one embodiment of the present invention.

FIG. 4A is a signalling diagram outlining a procedure 400 for achieving accelerated NS/NSI provisioning using the present system and method according to one embodiment. FIG. 4A depicts a procedure for a full life-cycle of a NS/NSI comprising a single update NSR. However, it should be appreciated that following creation of a new NS//NSI, the present system can be used to apply multiple update NSRs prior to termination.

In this example of the present process, a customer 405 submits a new NSR 422 to the NMS 410 requesting a new service. The NMS 410 forwards certain attributes 424 (e.g., service type, load, QoS metrics) to the NS/NSI modeling function 415, which constructs and initializes 428 a relevant NS/NSI model. This model is used to predict the behavior of the NS. The NMS 410 allocates network resources and configures the relevant NFs 426 according to the NSR. The NMS 410 forwards the service related performance indicators 430 to the NS/NSI Modeling Function 415.

The NS/NSI modeling function 415 updates the existing model and predicts/anticipates the behavior of the NS 432. In the case when there is correlation between different NSs, the modeling function 415 may predict behavior of one NS based on other correlated NSs. The NS/NSI modeling function 415 submits a predicted update NSR 434 to the NMS 410.

The NMS 410 pre-allocates resources and prepares the NFs 436 in anticipation of an update NSR 438.

The customer 405 submits an update NSR 438 requesting modification of the existing NS. If the update NSR 438 matches with the pre-allocated resources, the NMS 410 rapidly updates the NS 440 in accordance to the NSR.

The NMS 410 forwards the service related performance indicators 442 to the Modeling Function 415. The NS/NSI modeling function 415 updates the existing model and predicts/anticipates the behavior of the NS 444. The NS/NSI modeling function 415 submits a predicted update NSR 446 to NMS 410.

The NMS 410 scales down resources and prepares the NFs 448 in anticipation of a terminate NSR 450.

The customer 405 submits a terminate NSR 450 requesting to terminate the existing NS. If the terminate NSR matches with the configured resources, the NMS rapidly removes 452 resources in accordance to the NSR. The NMS may recover 452 the resources and allocate them to other NSs.

It will be obvious to the reader that the operations depicted in FIG. 4A are provided as an example in which the modeling function 415 correctly predicts, in a timely manner, the customer's 405 actions before they occur. In other cases the predictions may be partially or fully incorrect, or may be received too late for the NMS 410 to fully perform the required actions, such as pre-allocations or scaling (up or down) of network functions. Nevertheless, it is clear that an adequately performing modelling function 415 can be used to alert the NMS 410 in advance of customer 405 requests (e.g. 422, 438, 450), to the extent that such requests are predictable. These alerts can be used to begin required actions as soon as possible, and in a proactive manner, and also potentially before a corresponding customer request is received.

Figure 4B:
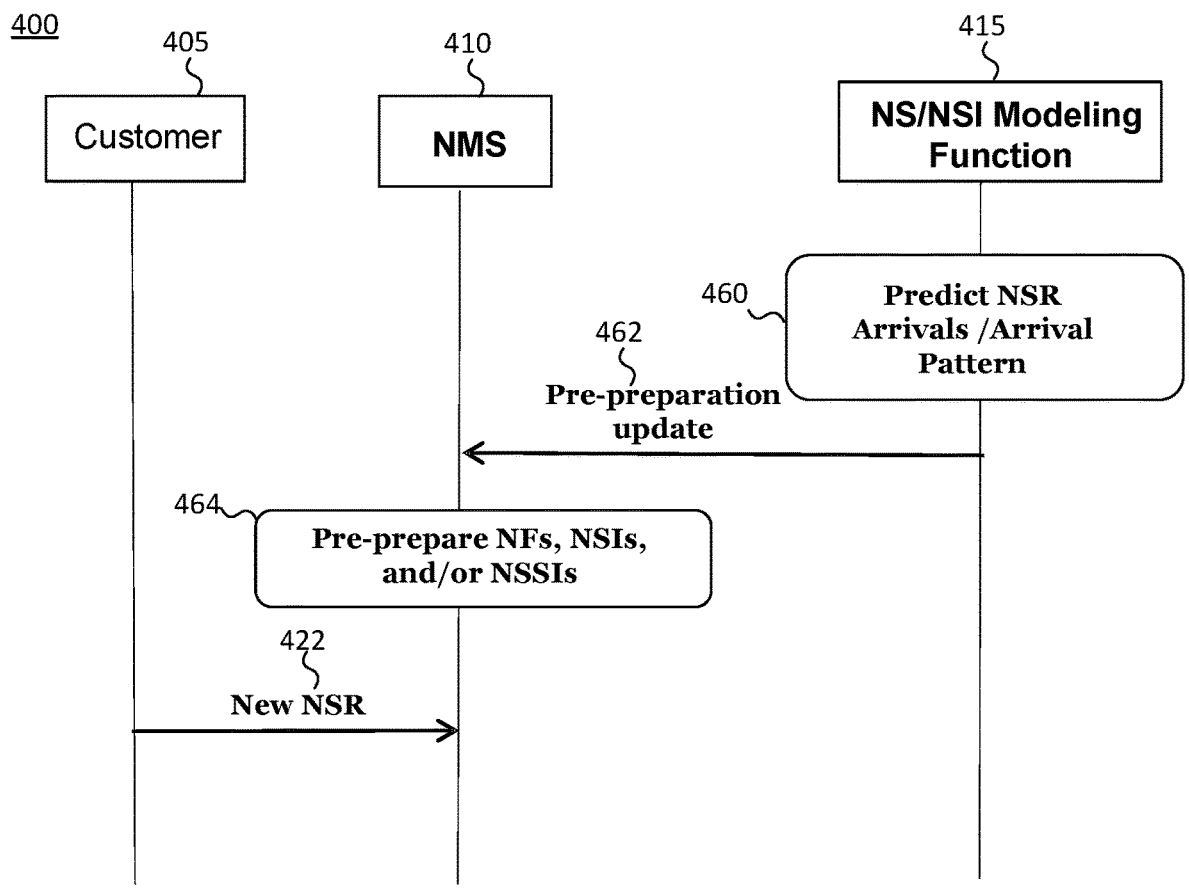
FIG. 4B is a signalling diagram related to a procedure for achieving accelerated network service/slice provisioning according to another embodiment of the present invention.

FIG. 4B illustrates aspects of the procedure 400 of FIG. 4A, according to an embodiment of the present invention. Various aspects illustrated in FIG. 4B will also be readily understood from FIG. 4A and other embodiments disclosed herein, for example in relation to pre-allocation operation 436 and network resource scaling and NF preparation operation 448. Thus FIG. 4B is provided for further clarity.

According to FIG. 4B, the NMS 410 performs a pre-preparation operation 464 in response to the pre-preparation update message 462 received from the NS/NSI Modeling Function 415. The NS/NSI Modeling Function 415 transmits the update message 462 in response to a prediction operation 460. Alternatively, the NMS 410 may trigger the pre-preparation operation 464 autonomously or in response to another stimulus. For example, the prediction operation 460 can alternatively be performed by the NMS 410. The pre-preparation operation 464 can occur, for example, prior to the NSR request 422 discussed with respect to FIG. 4B. Pre-preparation 464 can include pre-preparation of NFs, NSIs, NSSIs, or a combination thereof. Pre-preparation 464 can include allocation of resources, configuration of resources, or a combination thereof.

The prediction operation 460 is not necessarily based on modelling of a particular network service, but instead may predict the arrivals or indicate the arrival patterns of NSRs related to various types of network services. For example, the prediction may indicate the anticipated arrival of a certain number of requests for a certain type of NS within a certain time period. In response, the NMS 410 can pre-prepare faculties in a general way to support these predicted NSRs. For example, faculties capable of supporting a variety of NSs of a given type can be pre-prepared, such that they are later customizable to provide a more specific NS or more specific type of NS. As such, prediction 460 and pre-preparation 464 can be used to evaluate the arrival pattern of NSRs and assess the required resources to be pre-instantiated. These faculties can include configurable network infrastructure, NFs, NSIs, NSSIs, or a combination thereof. An NSSI refers to a network slice subnet instance, which can be part of an NSI.

There are various scenarios for supporting accelerated NS/NSI provisioning using the present system and method. In one scenario, the service setup delay should not exceed a certain maximum duration. To address this scenario, several existing services/slices of same/different flavors can be pre-prepared in anticipation of requests for new services or requests for updates of existing services. The pre-preparation process includes provisioning sufficient resources for the NFs in advance (which in some implementations may take required a longer time to perform) and possibly configuring application level parameters (which in many implementations takes less time than the provisioning) after receiving the NSR. The number of prepared services/slices may depend on the anticipated NSR arrival pattern and the type of the services specified in the NSR. This data is obtained and disseminated from the OSS/BSS, for example, from a monitoring function that tracks network statistics.

In another scenario, a network service may need to be provided at a specified scheduled time. In this case, preparation of service/slice can be performed in advance by exploiting the collected information about the delays incurred in preparing any or all of the involved components/elements. This information can be collected in each NSR, so that for any subsequent NSR, there is data that has been based on the time taken in previous, similar, NSRs.

In a third scenario, modification of an existing network service may be anticipated. A decision can be made by NMS in advance to prepare the network elements. The decision can involve preparation/configuration of NFs and/or it can involve moving certain user/traffic/session related contexts from one NF to another.

Irrespective of the scenario for application the present system and method, when creating a new slice (or sub-slices) the NFs may be prepared/instantiated/configured in different domains. This may be done using any or all of 3rd party infrastructure providers, 3rd party NF providers, and 3rd party sub-network providers. These network and domain administrators can already have collected information about the speed with which network states can be changed. The information may be network or domain specific, and may be based on the capability of the available infrastructure, or the software installation times, etc. Each domain/network administrator can transmit an estimate (or a measured value) of the delay to the NMS (i.e. Network Manager(NM)) that is responsible for slices using these resources. The services may be any of provision of, modification of and use of:
  VNF as a service
  Infrastructure as a service
  Software as a service, etc.

The corresponding durations can be related to one or more of the following aspects as necessary when using an existing NF or during preparation/instantiation/configuration a new NF:
  (1) Time to prepare/install new hardware (e.g. time to power on hardware)
  (2) Time to prepare/setup new software (e.g. time to on-board software and install the software)
  (3) Time to instantiate the VNF instance and bring it to active state
  (4) Time to scale-in/out, up/down
  (5) Time to re-configure NF
  (6) Time to change any intermediate states of an NF (e.g., standby state, pre-activation state)
  (7) Time for NF to access the associated data, transfer context from another NF etc.
  (8) Time to terminate the NF
  (9) Time to remove software
  (10) Time to power down the hardware It will be understood that in some embodiments, the duration may also be understood to be related to delays associated with signaling and communication latency (e.g. management related signaling delays) between NF and NMS, other NFs, or both.

Note that these durations may be employed by the NMS to identify the delays associated with a particular NF so that, during design phase of a slice (before creating the slice) the NMS can plan the starting times, choose which NF entities are to be used for a given slice, which domain will be used, etc.

Service Creation Using Pre-Prepared Slices/VNF

Figure 5:
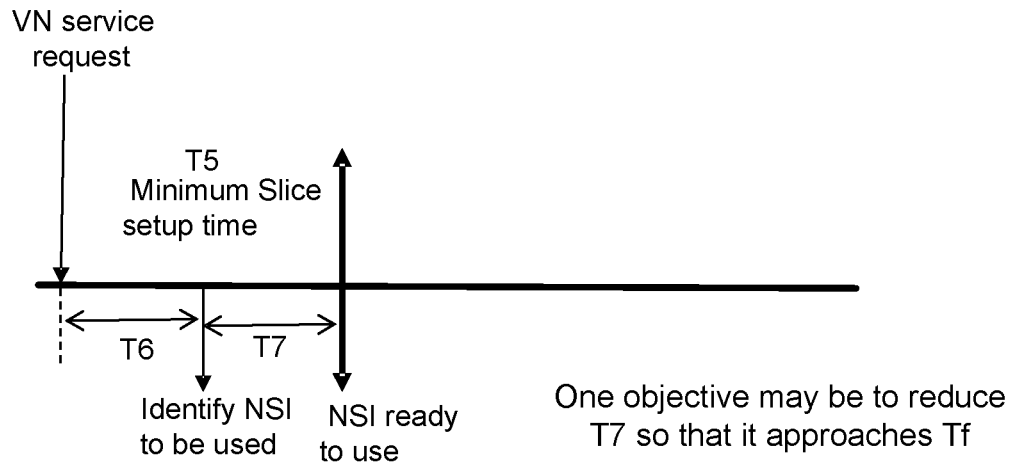
FIG. 5 is a diagram illustrating minimization of set up time using pre-prepared slices or VNFs.
Figure 6:
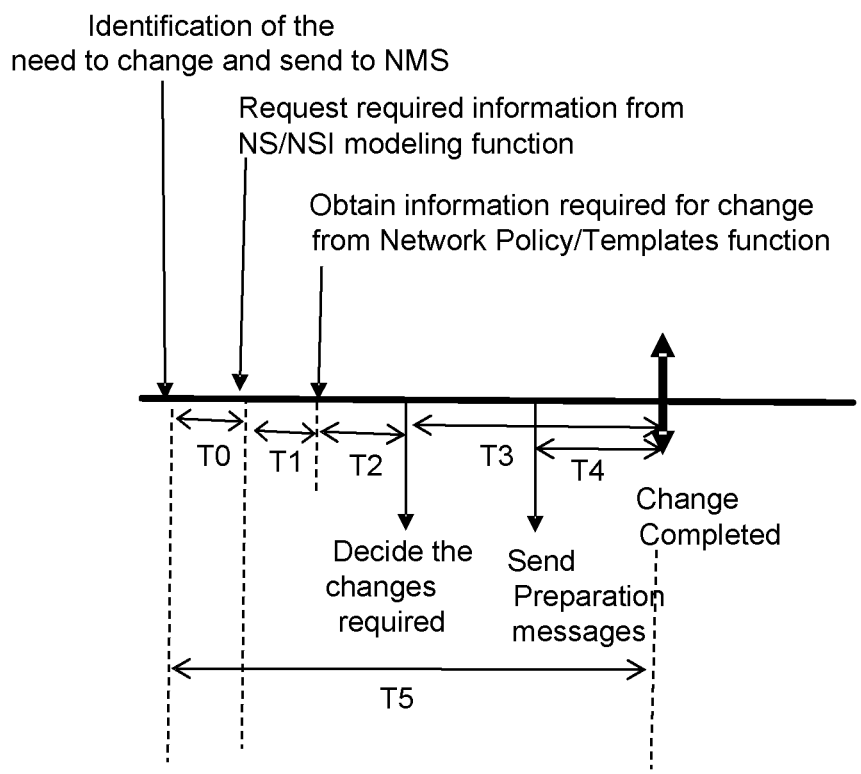
FIG. 6 is a diagram illustrating minimization of set up time when a new network service or a modified network service is anticipated.

FIG. 5 depicts an example of the time requirements for the scenario in which an NS is created using pre-prepared slices/VNFs. As will be understood in view of the above discussion this may be done to minimize setup time. T5 is the minimum network slice setup time, which is the sum of T6 and T7. T6 includes the time for VN-Admission Control and SLA negotiation, Running Logical Topology Evaluation and resource identification for NFs, i.e., decision taken to service the customer and determine the NSI composition and description. Note that T6 is similar to T0+T1+T2 (as shown in FIG. 6). T7 includes the time to instantiate and configure the network slice and include it as a service instance. Note that T7 is equivalent to T3 used in FIG. 6.

If the objective is to reduce T5, there are two options under this scenario: In a first option, a number of slices have been prepared ahead of time, and in a second option, a number of network elements within an NSI have been prepared ahead of time. In either option, the result is that when a new request of each service type arrives, the delay time T6+T7 can be reduced. A certain configuration time is still needed; however, it can be very quick as a basic configuration can be done in advance so that all that is required at the time of service creation is some specific parameter passing.

In some embodiments, a service may be provisioned using a combination of slices, some of which are pre-prepared, others of which are prepared using pre-prepared network elements, and still others that may be prepared in other ways.

In the first option, a required number of NSIs will be pre-prepared and setup to be ready for use for different service types (which require negligible setup time). The number of pre-prepared NSIs will depend on the number of NSRs that are anticipated to arrive in a given time duration.

The steps required for this first option may comprise:
  Determine the number of NSIs, N, that need to be prepared for a certain duration for a given service type;
  Obtain current traffic statistics for each service type (session arrival, duration, etc.);
  Evaluate the traffic demand for a stable duration that can be predicted considering meeting the SLA requirements;
  Evaluate the number of NSIs needed and the resource requirements for each service type/slice and for each NF given a certain duration to meet SLA+KPI requirements and signal the NFs, this duration determines the next evaluation time (note that a plurality of NFs may be required for a single NS/NSI); and
  Pre-setup the N number of NSIs needed.

Analyzing this example, where there are x number of expected NSRs during this time, there are N pre-prepared slices and Tf is the maximum time for NF and other component configuration time including delay in signaling, then the outage probability can be defined as:

$$Pr(x>N) = \text{Probability that the Set Up Time} > Tf$$

In the second option, a number of network elements are pre-prepared. For example, in the case of virtualized NFs (VNFs), depending on the required instantiation and configuration rate of individual VNFs, a number of VNFs may be kept instantiated and always ready to accept a quick configuration command for a slice. In the case of physical NFs (PNFs), depending on the required preparation rate of individual PNFs, a number of NFs may be pre-configured and always ready to accept a quick configuration—update command for a slice.

The steps required for this second option may comprise:
  Classify the components to be prepared into certain classes based on the time needed to instantiate them, and determine the number of NFs required for a given NF type (not all NFs are required for a given slice) based on N (the number of NSIs needed);

Prepare N1 of NF1 type and N2 of NF2 type at the evaluation time (similar to preparing N slices in the previous option).

Note that different classes of VNF may have different instantiation times (i.e., different VNFs may not take same time to instantiate). Consequently, the final step can be delayed until the last time instance requiring preparation, and at that time decide how many are required.

An example of the type of service that can benefit from service creation using pre-prepared slices/VNFs is a conferencing service. In this example, the customer wants to set up the service as early as possible, to make it available to its users. The customer will also want the service to be set up as quickly as possible (e.g., the minimum time may be specified as 1 minute, or less). The NMS, employing information received from the NS/NSI modelling function, may select those NFs that don't have large setup times. These NFs can be pre-prepared without consuming excessive resources because they can be prepared using anticipated arrival patterns associated with the conferencing service. For example, it may be that typically two requests for the conferencing services are received every hour. In which case, sufficient NFs are pre-prepared to support at least 2-3 requests per hour.

The system also needs to adjust for the possibility of more than 2 requests per hour and the possibility that 3 or more requests may be received at the same time. The present system and method relies on the NS/NSI modelling function to provide information regarding delay times for set-up so that faster nodes or closer nodes can be used to create the required NFs and reduce delay time, if necessary, to meet higher than anticipated demands.

Timed Service Provision or Modification of an Existing NS/NSI

FIG. 6 depicts the time requirements for the scenario in which an NS is required at a particular time, or an existing NS/NSI modification is anticipated or required at a particular time.

T0 is the time between identification of the need to change with a request being sent to the NMS and sending of the request for information from the NMS to the NS/NSI modelling function. The length of T0 may be dependent upon the delays in passing the NSR trigger to the network management system (NMS).

T1 is the time required for obtaining the information required for the change from the Network Policy/Templates function. The length of T1 may depend upon where the network status information is available for use in the decision that the change is required. The length of T1 may depend on how fast the information can be accessed.

T2 is the time required decide which change (or changes) is required (this time may be negligible).

T3 is the time required to execute the change after a decision has been made. This step can include evaluating the traffic demand for a stable duration. The stable duration, and possibly the time of T3 can be predicted by taking into consideration the SLA requirements. The length of T3 may depend on the maximum of the preparation times of all the NFs (including message delay). T3 also includes any context/data transfer time required.

T4 is the time interval during which the preparation messages should be sent to a given component (e.g., VNF). The length of time interval T4 may depend on individual delay of each VNF. The preparation messages can be sent earlier than the illustrated start time of T4, but the time at which the instructions should be executed (i.e. the execution time) should be specified.

T5 is the total time required to make a change, once a change requirement is detected (should be done in advance). As illustrated, T5 is the sum of T0–T4, i.e. T0 to T4.

In this option, the NS/NSI modeling function can predict the required change T2 time in advance and identifies the requirement at least T5 time in advance of the time at which the service or service modification is required.

An example of the type of service that will benefit from application of the present system and method according to scenarios in which there is a timed service provision or modification of an existing NS/NSI, is an ambulance service, or suite of services.

In this example, an ambulance is dispatched to pick up a patient in need of urgent medical care. The ambulance knows its destination and can immediately request set up of services for, for example, ambulance communications, and online diagnostics. Of course, these services will be urgently required following arrival at the location of the patient. However, having them instantiated and available before arrival at the patient location may be an unnecessary use of the resources. Because the network knows the location of the patient and the route of the ambulance, the time until the ambulance requires services can be predicted so that the time until the services are required can also be predicted.

The types of services required by the ambulance may be costly and the may be provisioned without delay following receipt of a specific service request. Accordingly, a timed service provision is beneficial to ensure service availability without unnecessary use of costly resources. However, the driving route that the ambulance takes back to the hospital may alter its access to the required services, or the delay in accessing the services. To address this issue, the method and system of the present application can be applied to partially prepare the services along the various routes that the ambulance may take, depending, for example, on vehicular traffic patterns. This means that the present method may be applied in a dynamic approach such that NFs or NSIs are set up, or modified, for a set period of time into each of the possible driving routes of the ambulance. Once a particular route is taken, the NFs or NSIs in the non-selected routes may be released. This procedure can continue as route options become available to the ambulance as it travels to the hospital.

In applying this process, the NS/NSI modeling function communicates information regarding time to the next NFs and associated delays for instantiation or modification (as applicable). These times and known delays are employed by the NMS to determine how far in advance to set up services with minimum resource wastage. Referring back to FIG. 6, in this example, the ambulance needs to communicate service requests or modification requests T5 time ahead of requiring the service. Recall that T5 is the minimum time required to ensure that a service is available.

The features of embodiments of the present invention as outlined in the remainder of this description will be readily apparent from the preceding discussion.

In various embodiments, information relating to (or regarding) network service dynamics can include predictions of new NSRs (e.g. requests for a new NS), predictions of NSR updates or modifications (e.g. requests to update or modify an NS), or predictions of NSR terminations (e.g. requests to terminate an NS). As already mentioned, the predictions are used to anticipate the behaviour of network services and are generated based on constructed models handled by a modelling function. Information relating to network service dynamics can include predictions of amounts and types of network resources that will be required for fulfilling NSRs at a specified future time. The information relating to network service dynamics can include predictions of network service requests or requirements, based on input information available to the network. Predictions can include predictions of future times at which an NSR (e.g. new NSR, update NSR, or Terminate NSR) may arrive. Predictions can include predictions of amounts of resources, types of resources, or both, that will be required to satisfy a predicted NSR. Predictions can include predictions of amounts of resources, types of resources, or both, that will be freed in response to a predicted NSR. Information relating to network service dynamics can include indications of how demand for the network service evolves over time, time-varying amounts and types of network resources (e.g. particular network functions) used, time-varying network or geographic locations of usage, or time-varying rates of requests for the network service, or a combination thereof.

In some embodiments, information relating to network service dynamics includes information regarding how the network infrastructure can accommodate demands for network services. That is, the network service dynamics may include dynamics related to the network infrastructure's capability to support the network service. To this end, the network service dynamics may include dynamics related to the infrastructure's capability to support individual NFs used for the network service. The dynamics can include timing information, capacity information, etc. In some embodiments, the information relating to network service dynamics can include duration information corresponding to one or more of the 11 different durations or types of delays listed above. These can be delay times reported by the network indicative of delays in instantiating NFs for supporting a NS. In some embodiments, the information relating to network service dynamics can include NF usage statistics, NSI or NSSI usage statistics, loading change statistics, or a combination thereof. The information relating to network service dynamics can therefore reflect the changing network status and behaviour of the network.

In various embodiments, resources can be pre-allocated for providing a new NS or modifying an existing NS, either in an existing NSI or a new NSI (for which resources may also be pre-allocated, or for which supporting NFs can be pre-prepared, or both). The pre-allocation can be performed by the NMS in response to a prediction received from the NS/NSI modeling function. The pre-allocation can be based on the information in the prediction. For example, the prediction can indicate types and amounts of resources that will be required for satisfying a predicted new NSR or predicted update to an existing NSR.

Pre-allocation of resources can include some or all of: identifying particular instances of available resources to be used; reserving available resources; using resources to instantiate a generalized NS, NF or NSI; configuring or pre-preparing a generalized NS, NF or NSI; and activating a NS, NF, or NSI.

Timing of pre-allocation of resources can be set so as to facilitate the timely response to an anticipated NSR. For example, when a network service agreement specifies that a certain type of NSR will be accommodated within a certain amount of time T following receipt of the request, some (or possibly all) of the required operations can be performed prior to receipt of the request if the request is anticipated. This will leave more time and freedom for timely accommodating the request within time T after the request is received. If the prediction is less certain, then fewer pre-allocation operations may be performed, while if the prediction is more certain, then more pre-allocation operations may be performed, thereby more fully dedicating resources toward accommodating the NSR. The effectiveness of pre-allocation will depend on the reliability and accuracy of the predictions.

It should also be noted that the use of a modeling function to make predictions allows for pre-allocation actions to be made selectively. That is, without a prediction, resources can still be pre-allocated in anticipation of a request. However without a prediction regarding the timing and nature of the request, the pre-allocation might be made far in advance of the request, and reserve more resources than the request requires, thus resulting in inefficiency. A predictive model can mitigate these inefficiencies by causing pre-allocations to be made more selectively with respect to when they are needed, and only using a limited amount and type of resource.

In various embodiments, resources currently being utilized for providing an NS can be marked (by the NMS) as being provisionally available as of a certain time, in response to a prediction that an NS will be terminated or scaled down. The prediction can be received from the NS/NSI modeling function. The NS/NSI modeling function can then prepare for their reallocation. Marking of resources as being provisionally available can allow for more effective reuse of such resources, because the NMS or other processes do not have to wait until the resources are actually released to begin preparations for their reallocation. Alternatively, the modelling function can mark the resources as being provisionally available.

As already set forth above, the NMS can include or employ some or all of: a network manager, a domain manager, an element manager, and an NFV-MANO. In some embodiments, one or more domain managers can report to a network manager in a hierarchical structure. The domain managers can report, to the network manager, timing parameters related to their own domains. The timing parameters can indicate expected delays associated with various operations, such as operations related to instantiating or modifying network functions supporting a network service or network slice instance. The network manager can then use this information to select which domains to use for supporting a new or modified network service or network slice instance. For example, if it is anticipated that a network service or network slice instance will require quick reconfigurability, only domains reporting reconfiguration times above a cutoff value may be used to support this service or slice instance. The timing parameters can be used to predict future delays related to providing futures NSs.

The NMS can make pre-allocation decisions based on a combination of factors. For example, resources to be pre-allocated can be selected based on their location, cost of use, speed of configuration (e.g. with closer or more expensive resources being configurable more quickly), and reliability. Resources can be selected based on the importance that the NS be provided in a timely manner.

Figure 8:
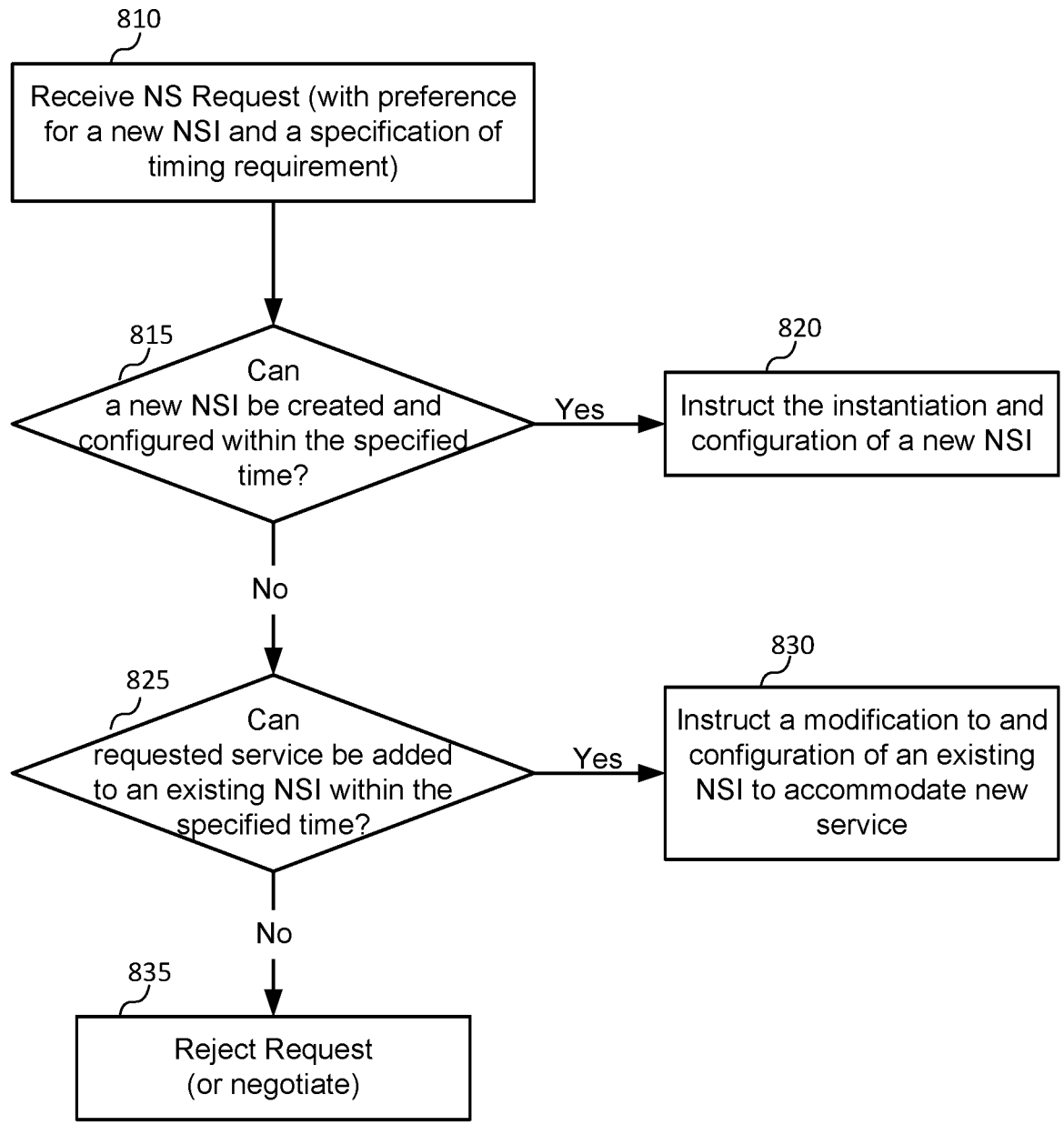
FIG. 8 illustrates a process of network service/slice provisioning according to another embodiment of the present invention.

FIG. 8 illustrates a process of network service/slice provisioning according to another embodiment of the present invention. The process of FIG. 8 it is comparable to the process of FIG. 3. According to FIG. 8, a NS request is received 810 which includes or is otherwise associated with a preference that a new NSI be used to accommodate the NS request. A specification of a timing requirement, such as a time at which the NS will be required, is also received. A determination 815 is then made as to whether or not a new NSI can be created and configured for accommodating the NS while complying with the timing requirement. If so, the instantiation and configuration of such a new NSI is instructed 820. Otherwise, a second determination 825 is made as to whether or not the requested NS can be added to an existing NSI while complying with the timing requirement. If so, the modification to, and configuration of, such an existing NSI to accommodate the new NS is instructed 830. Otherwise, the NS request is rejected 835. In some embodiments, rather than the process of FIG. 8 being triggered by an NS request, the process can be triggered by a prediction of an NS request.

Figure 9:
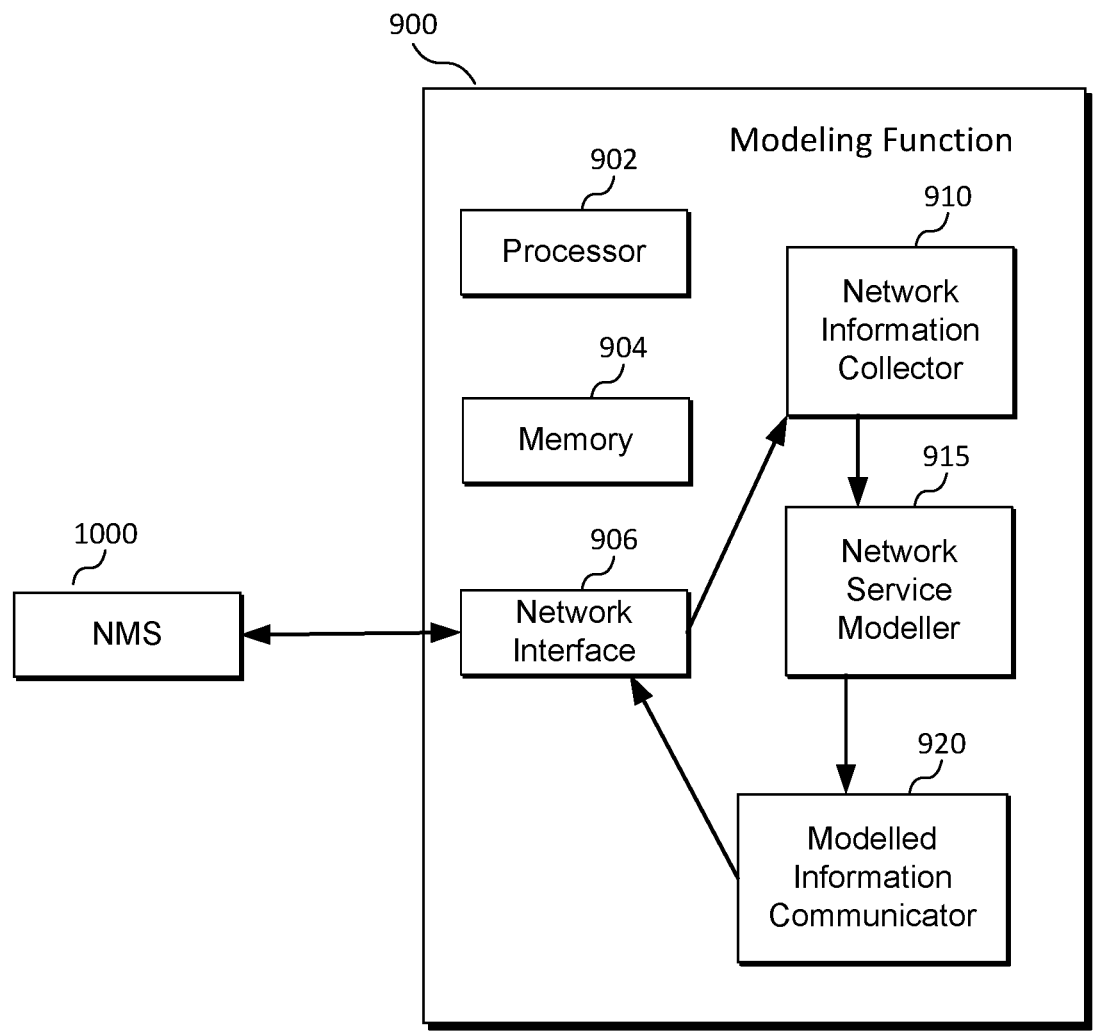
FIG. 9 illustrates a modelling function provided according to an embodiment of the present invention.

Having reference to FIG. 9, embodiments of the present invention provide for a modeling function 900 operating in a communication network. The modeling function includes or is associated with a processor 902, a memory 904, and a network interface 906. The modelling function is configured to collect, using the network interface, input information relating to a network service, for example using a network information collector 910. The modelling function is further configured to maintain, using the processor and the memory, modeled information relating to network service dynamics, for example using a network service modeller 915. The modeled information is maintained based on a computational model incorporating the input information. The modelling function is further configured to transmit, using the network interface, the modeled information to a network management service (NMS) 1000 operating in the communication network, for example using a modelled information communicator 920. The transmitted modelled information can be used by the NMS in one or more of: creation, modification, and termination of the network service. The modeled information may be an explicit request for the NMS to perform an action, or information based on which the NMS can determine an action to perform and a time to perform the action.

In various embodiments, the modeled information includes a prediction of future behaviour of the network service. The prediction of future behaviour can include a prediction of a request to modify, scale, or terminate the network service. The prediction can include a time of the request, a type of the request, details of the request such as an amount by which to scale the service, etc. The computational model can include a model of the requirements of the network service, such as the time-varying usage of network resources by the network service. The model may be configured to predict when the network service will be more in demand and when it will be less in demand. In various embodiments, the model may be configured to provide its predictions to the NMS in a sufficient amount of time that the NMS can accommodate the predictions. For example, the model may predict a time at which a predicted request is to be accommodated, and notify the NMS a predetermined amount of time before the predicted time. The predetermined amount of time is typically sufficient for accommodating the request by the predicted time. Predictions may the predictions of requests for the NS as a new service, predictions of modifications, such as scaling up and down, of an existing NS, or predictions of termination of an NS. Some NSs, such as those supporting scheduled voice or video calls, or use of network resources for a specific purpose and a specific time, may be more predictable than others.

In some embodiments, the modeled information includes an indication of time delays anticipated during creation or modification of the NS. These time delays can be dependent on the types of network functions required for supporting the NS, or other factors such as network loads, location of available equipment used to provide the network functions, and type of available equipment used to provide the network functions. Time delays may be a function of anticipated willingness to pay for higher quality network resources.

The modeled information can include information regarding capabilities and time delays for various network infrastructure devices and locations, which are potential points of presence (PoPs) for network functions or portions thereof. Network functions can be categorized (e.g. based on delays) assuming that they are instantiated at a given PoP. Network functions can be categorized for a plurality of potential PoPs. For example, the categorization may indicate plural component categorizations across multiple PoPs.

It is also noted that the input information provided to the modelling function can include information carried in an initial request for the network service. This information may be used by the modeling function to initialize the computational model. For example, the initial request may include an indication of the type of network service, its location, priority, expected usage patterns, etc. The computational model of the NS can then be established reflect these parameters. Furthermore, as new information is obtained, such as performance indicators related to provision of the NS, this new information can also be provided to the modelling function and used to update the computational model.

Furthermore, different NSs may be correlated with each other, and the modelling function may determine the correlations and maintain various models based on same. For example, demands related to one NS may be positively or negatively correlated with demands related to another NS, possibly with a time delay. Therefore changes in demands of the first NS may be used to predict changes in demands of the second NS.

As noted above, a variety of delays can be associated with one or more of preparation, instantiation, and configuration of an NF. A list of 11 different durations correspond to different types of delays was provided previously herein, beginning with time to prepare/install new hardware. In various embodiments, the modelling function receives information regarding one or more of these types of delays, in relation to providing an NF as part of an NS. Additionally or alternatively, the modelling function may estimate one or more of these types of delays based on other information received from the NMS.

In some embodiments, the modelling function is configured to indicate a set of NFs to be used to support a given NS. The modelling function can indicate the timing required to provide these NFs, for example including one or more of instantiation, configuration, and activation. This may be provided in relation to one or more of NSI pre-preparation, service deployment, service modification, and NSI modification.

In various embodiments, collecting input information by the modelling function includes obtaining some or all of the above-mentioned information regarding NFs, location of NFs, time to communicate with NFs (messaging time), network loading conditions, a network topology, etc.

In various embodiments, maintaining modeled information by the modeling function includes maintaining information related to changes in one or more of the 11 durations mentioned above. In various embodiments, maintaining modeled information by the modeling function includes maintaining information related to one or more of: NF usage statistics, NSI usage statistics, and loading change statistics.

It should be noted that collected input information relating to a network service can include information regarding an already-existing network service, or information relating to an anticipated but not yet existing network service, or both types of information at different times. Information relating to an anticipated network service can include information relevant to the creation of the network service. This can include information regarding when a request for the new network service is expected (e.g. a time estimate or request arrival pattern), information regarding time is required to instantiate the new network service, network resources available for instantiating the new network service and their delay information, current status of the network in terms of pre-prepared NFs, NSIs and NSSIs, network service dynamics which are relative to the network service, etc.

Figure 10:
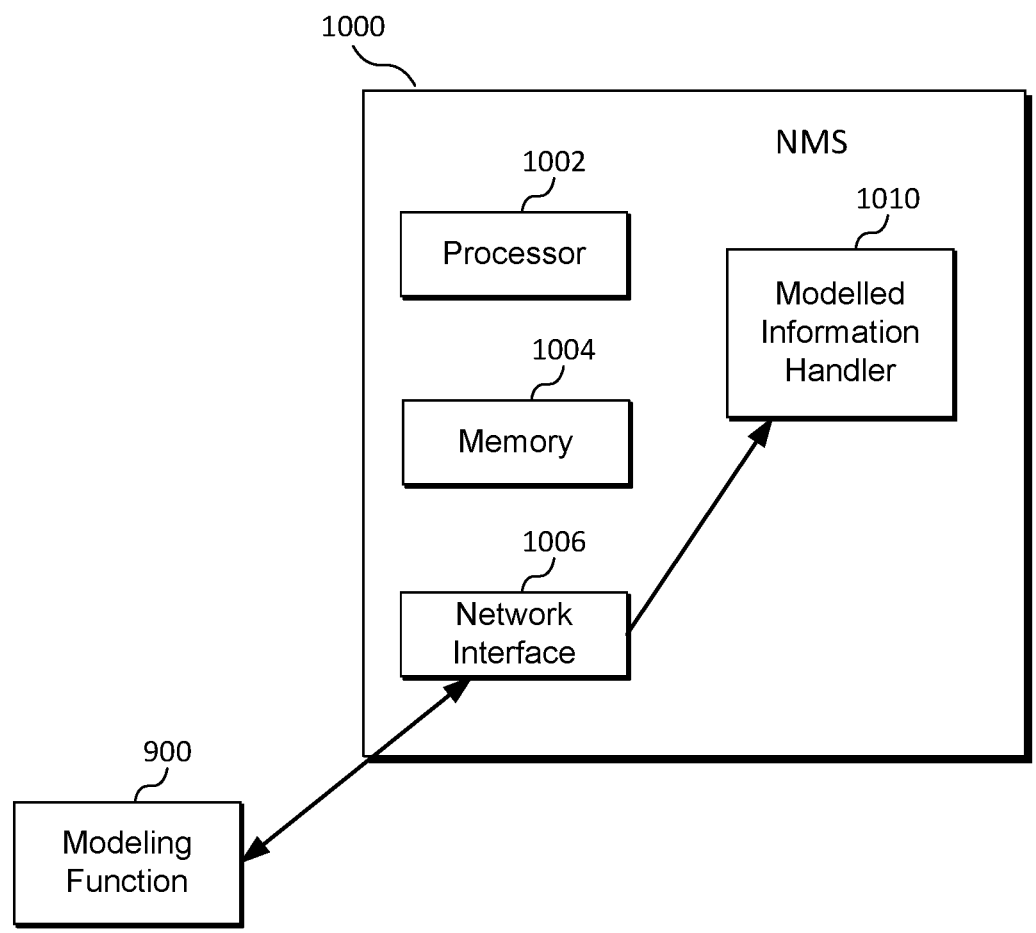
FIG. 10 illustrates a network management function provided according to an embodiment of the present invention.

Having reference to FIG. 10, embodiments of the present invention provide for a network management service (NMS) 1000 operating in a communication network. The NMS includes a processor 1002, a memory 1004, and a network interface. The NMS is configured to receive, using the network interface, modeled information from a modeling function. The modeled information relates to network service dynamics, such as dynamics of a network service managed by the NMS. The NMS may include a modelled information handler 1010 for receiving and handling the modelled information. The NMS is further configured to direct, using the processor, the memory and the network interface, underlying resources to create, modify or terminate, or to prepare to create, modify or terminate the network service within the communications network, using the modeled information. Various forms of the modelled information are discussed above with respect to the modelling function. The underlying resources can include network control and management functions responsive to commands, issued by the NMS via the network interface, or sub functions or subroutines of the NMS itself, which interact with other network elements via the network interface.

When the NMS receives a predicted time at which creation or modification of the network service is required, the NMS may be configured to accommodate creation or modification of the network service by the predicted time by pre-allocating network resources to the network service prior to receipt of the request. In various embodiments, this accommodation performed within a limited, possibly minimal, amount of time before the predicted time, so as to avoid pre-allocating resources before they are actually required. Pre-allocation of network resources, and the related pre-preparation of network functions, network services, and network slices, generally relate to actions taken in anticipation of a future request or command. Embodiments of the present invention provide for timing of beginning pre-allocation and pre-preparation actions so that the actions are completed by a predicted time (at which the service is needed). This is done by calculating the time required to perform the actions (also referred to above as the predetermined amount of time), and setting the action beginning time to be less than or equal to the predicted time minus the required action performance time.

In various embodiments, faculties subject to pre-preparation can include network infrastructure, network functions (NFs), NSIs, NSSIs, or a combination thereof. In some embodiments, the pre-preparation can include acquiring the faculty from a third party. The faculty may be in a ready-to-use state upon acquisition, or they may require further configuration. In some embodiments, the pre-preparation can include instantiating but not configuring (or at least not fully configuring) the faculty. In some embodiments, the pre-preparation can include instantiating and configuring the faculty, but maintaining the faculty in a standby (i.e. not activated) mode. In the standby mode, zero, very few or minimal underlying network resources are consumed by the faculty. In some embodiments, the pre-preparation can include instantiating and configuring the faculty and activated mode is ready to use for traffic flow, such that network resources consumed are limited. Limiting of the network resources may be enforced simply be due to a lack of usage, such as a lack of traffic flow.

In various embodiments, the type and location of resources being pre-allocated can be selected based on the amount of time available for performing the pre-allocation. For example, a faster or more responsive set of resources may be selected when pre-allocation is required more quickly. Selection of faster or more responsive resources can be subject to cost constraints, for example when use of such resources will incur additional charges.

Pre-allocation can be timed based on a determination of when the network service is required, as well as an estimate of setup time for the network service. Pre-allocation can include sequentially instantiating, configuring, and then activating resources to provide the network service. Times required for each of these steps and their coordination can be estimated and a sufficient number of the steps can be performed in order to facilitate timely accommodation of a NSR.

Pre-allocating network resources for supporting the network service or a network slice instance for accommodating same may be performed as part of the preparation to create or modify the network service. It is also possible to partially pre-allocate network resources. For example, the modelling function can provide a prediction that N different network services will be requested in the next T seconds. The different network services may not be known precisely, but each may require similar network resources. Therefore, resources for supporting N different network services can be partially pre-allocated by reserving the resources but not fully configuring them. As the requests arrive, further configuration can be performed on the reserved resources. This reduces the configuration time, because the resources are already identified and reserved. However, full configuration for accommodating a specific NS is deferred. As such, preparing to create or modify a network service can include partially pre-allocating network resources for supporting the network service or a network slice instance supporting the network service, where the partially pre-allocated network resources are configurable, via a final configuration, for supporting one of a plurality of potential network services or network slices, including the network service or the network slice. The final configuration can be performed upon receipt of a customer request for the network service. Furthermore, the partially pre-allocated network resources can be released upon determining that the network service or the network slice instance is no longer needed.

In some embodiments, the NMS is configured to predict an arrival pattern of requests for new network services or modifications to existing network services. The prediction may performed in association with the modelling function. Based on the predictions, a sufficient number of NSs, NFs, NSIs, or a combination thereof, of appropriate types, can be created, modified, or advance preparations can be made for such creation or modification in a timely manner (i.e. such that creation or modification is complete by a specified deadline). The deadline can be an explicit time at which the NS is required to be available. The deadline can be set equal to the earliest time at which a request for the NS is expected plus a delay time. The delay time can be specified in a service agreement as a maximum delay in setting up network services.

Moreover, a number of NFs, NSs or NSIs may be initially created to be sufficiently generic to support a number of the requests. At a later time one or more of these can be modified to support some of the requests but not others. Thus, NFs, NSs or NSIs can initially be generic, but as further information indicating anticipated requirements is received, they can be refined to more specialized purposes.

NFs can be categorized (e.g. into different classes) according to how quickly they can be configured, instantiated, and activated. In some embodiments, the NMS performs the categorization. In other embodiments, the modelling function performs the categorization. In still other embodiments, the NMS and the modelling function cooperatively perform the categorization. The categorization may be depend on the location in the network at which the NF may be (e.g. is proposed to be) instantiated, a type of equipment upon which the NF may be (e.g. is proposed to be) instantiated, or a combination thereof. For categorizing NFs based on associated delays, the categorization may indicate an expected performance of the NF assuming its instantiation at one or more given PoPs or types of PoPs. As such, the modeled information may include delay information varying by PoP. The categorization may also be a function of the amount of cost a customer is willing to incur to access an NF. Prediction of delays in providing an NS can depend on what types of NFs are required in supporting the NS. Categorization of NFs can facilitate the identification of required NFs supporting an NS. This can further facilitate negotiation related to providing NFs, for example negotiation between domains or between management systems and modelling functions. For example, rather than negotiating for resources to provide a particular NF, an entity can negotiate for resources to provide an NF belonging to a particular class. In some embodiments, instead of communicating detailed requirements for an NF, an identifier of the class to which the NF belongs can be communicated. The receiver of the class identifier can look up the detailed requirements in a predefined lookup table which lists requirements for each predefined class of NF.

In view of the above, in some embodiments, an NMS is configured identify one or more classes of network functions (NFs) required for supporting a NS. Furthermore, the NMS directs underlying resources to create, modify or terminate, or prepare to create modify or terminate, the NS. In particular, this direction comprises providing an indication of the one or more classes to the underlying resources. In response, the underlying resources perform one or both of resource allocation and timing of NF operations based on the indication of classes. These operations can include the creation, modification or termination (or preparation of the creation, modification or termination) of NFs supporting the NS.

In some embodiments, the input information collected by the modelling function can include indications of limitations, associated with various network resources, that can be used to determine which classes of NFs can be supported by these resources. For example, the input information collected by the modelling function may include one or more indications of classes of NFs that can be supported by specified portions (e.g. PoPs) of the network infrastructure. The input information can include a set of classes of NFs that can be instantiated at different PoPs, the classes indicative of NF characteristics such as expected amount of time taken to perform one or more of: NF instantiation, NF configuration, NF activation, NF modification, NF termination, and communication with the NF. Viewed another way, the input information includes an indication of network resources capable of supporting particular network functions. Some network infrastructure resources may not have sufficient capabilities, such as communication or processing bandwidth, to support NFs having stringent requirements, such as speed of instantiation, configuration, activation, modification, or a combination thereof. Because of this, it is desirable to avoid attempts to instantiate NFs using resources that cannot support them.

In some embodiments therefore, the modelling function is configured to determine, based on the input information indicative of network resource limitations, which network resources to use to instantiate a given NF, for example based on its class. The modelling function may select certain network infrastructure or locations for instantiating an NF based on limitations such as instantiation, configuration, activation, or modification delays, or a combination thereof.

In some embodiments, the modelling function receives NF categorization information from the NMS. In other embodiments, the modelling function receives NF categorization information from network infrastructure devices, or performs NF categorization based on information received from network infrastructure devices. Subsequently, the modelling function selects instantiation points, including network locations and types of network infrastructure, for a required NF. The selection is based on the class of the NF. The selection may further be based on the network topology. The modelling function subsequently informs the NMS to instantiate the NF, and associated NSIs and NSSIs where applicable, at the selected instantiation points.

As such, according to embodiments of the present invention, input information provided to the modelling function includes an indication of network resources capable of supporting the one or more network functions. The modeling function is then configured to select, from among network resources corresponding to the indication, one or more particular network resources for use in instantiating or potentially instantiating the one or more network functions. The capable network resources may be determined based on requirements of the one or more network functions in comparison with nominal or determined capabilities of the network resources. The requirements of the one or more network functions may include requirements to perform one or more operations involving the network functions within a predetermined time limit, such as instantiation, configuration, activation, modification, or a combination thereof.

Preparing to terminate a network service may include scaling down network resources, as well as preparing to terminate network functions supporting the network service or preparing to or scale down a network slice instance supporting the network service. In some embodiments, preparing to terminate the network service includes marking network resources currently supporting the network service, or a network slice instance supporting the service, as being available as of a future time corresponding to expected termination of the network service.

To support prediction, the NMS, possibly in conjunction with the modelling function, may collect information indicative of delays experienced during preparation of network services or network slice instances of a given type. This collected information can be used to predict expected delays in preparation of subsequent network services or network slice instances of the given type. This information can be collected and tracked for multiple different networks, domains, NSs, NSIs, etc. As such, when an action is required by a specific deadline, a network or domain with lower anticipated delay can be selected for performing this action when this deadline is close, and conversely when the deadline is further, a network or domain with higher anticipated delay can be selected. Such selection can be performed according to a trade-off between tolerance to cost and tolerance to delay. In some cases, network or domain administration functions can provide, to the NMS, indications of delays expected when creating or modifying the network service using resources thereof. Based on these indications, the NMS can determine a combination of: a time to begin creating or modifying the network service; and a network or domain to use for creating or modifying the network service.

The connection between NSs and NSIs includes that existing NSIs can be used in some cases to support new NSs, and in other cases new NSIs can be instituted to support the new NSs. As such, creation, modification or termination of a NS can include creation, modification or termination of an NSI supporting the NS. Information provided to the modelling function can therefore include information relating to the NSI supporting same. Creating, modifying, or preparing to create or modify a network service can include one or more of: creating a network slice instance for supporting the service; deploying the network service within an existing network slice instance; modifying another network slice instance to accommodate the network service; and modifying another network service to provide the network service.

It should also be noted that creating, modifying, or preparing to create or modify a network service typically includes creating, modifying, or preparing to create or modify one or more network functions supporting the network service. This is because an NS is typically supported by one or more NFs. Times required to provide an NS can be derived from the times required to provide the supporting NFs.

Figure 11:
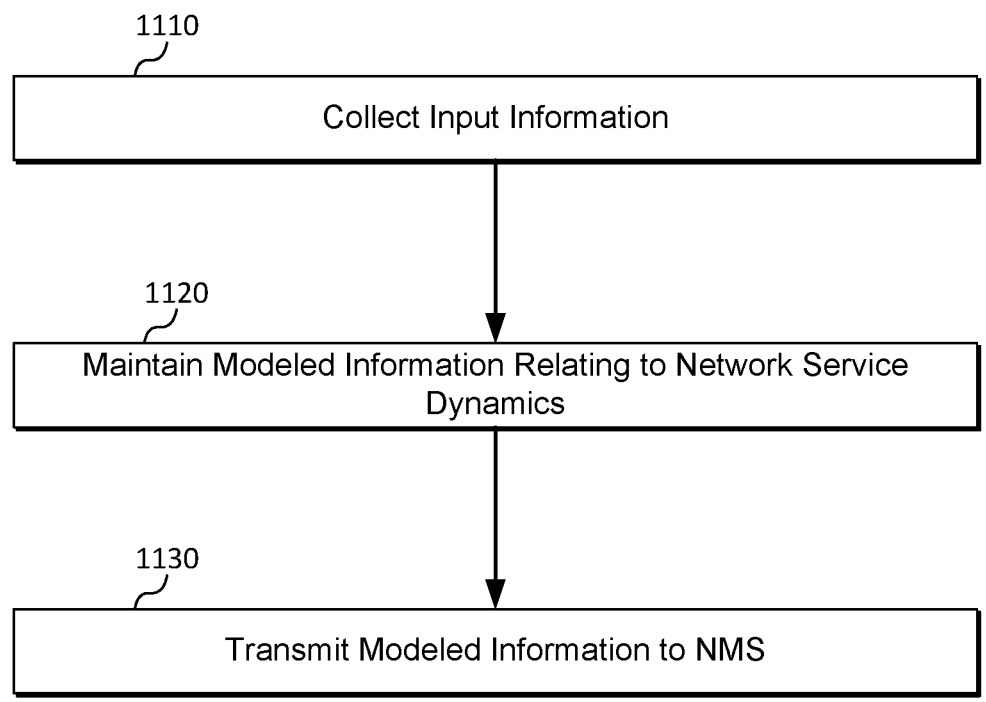
FIG. 11 illustrates a method provided according to an embodiment of the present invention.

FIG. 11 illustrates, for completeness, a method 1100, in a communication network, provided in relation to the modelling function. The method includes collecting 1110 input information using the modeling function. The input information relates to a network service provided by the communication network. The method further includes maintaining 1120 modeled information relating to network service dynamics. The modeled information is maintained based on a computational model incorporating the input information. The method further includes transmitting 1130 the modeled information to a network management service (NMS) operating in the communication network, for use in one or more of: creation, modification, and termination of the network service. The transmitted modeled information may be an explicit request for the NMS to perform an action, or information based on which the NMS can determine an action to perform and a time to perform the action.

Figure 12:
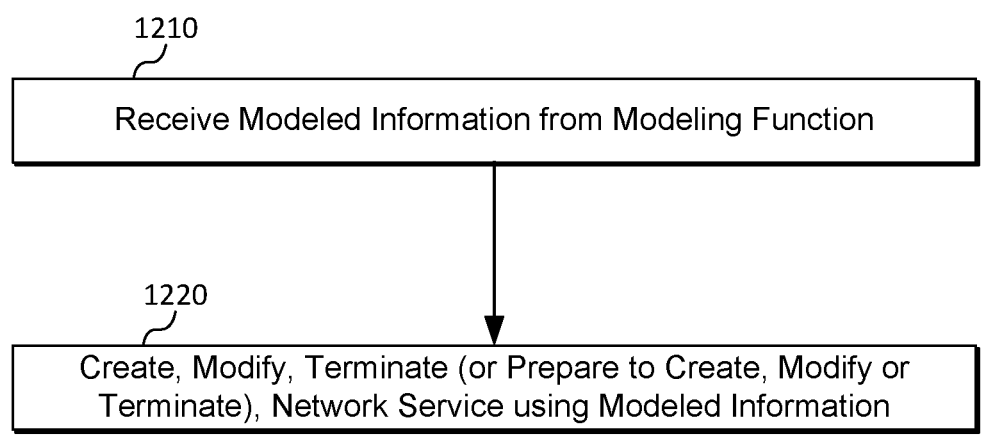
FIG. 12 illustrates a method provided according to another embodiment of the present invention.

FIG. 12 illustrates, for completeness, a method 1200, in a communication network, provided in relation to the a network management service (NMS). The method includes receiving 1210 modeled information from a modeling function. The modeled information relates to network service dynamics, such as dynamics of a network service managed by the NMS. The method further includes directing 1220 underlying resources to create, modify or terminate, or to prepare to create, modify or terminate the network service within the communications network, using the modeled information. The received modeled information may be an explicit request for the NMS to perform an action, or information based on which the NMS is configured to determine an action to perform and a time to perform the action.

Embodiments of the present invention provide for a system for providing a service in a communications network. The system includes a network service/network slice instance (NS/NSI) modeling function, in communication with a network management service (NMS). The modeling function is configured to collect and maintain (or to direct underlying resources to collect and maintain) information relating to network service dynamics. The modeling function is further configured to transmit the information relating to network service dynamics to the NMS for use in creation modification or termination of services. Embodiments of the present invention provide for a modeling function as described above.

Embodiments of the present invention provide for a network service/network slice instance (NS/NSI) modeling function comprising a computer processor having a memory and a network interface. The NS/NSI modeling function is configured to (or is configured to direct underlying resources to) collect and maintain information relating to network service dynamics and to communicate the information relating to network service dynamics to a network management system within a communications network.

Embodiments of the present invention provide for a system for providing a service in a communications network. The system includes a network management service (NMS), in communication with a network service/network slice instance (NS/NSI) modeling function. The NMS is configured to (or is configured to direct underlying resources to) create, modify, or terminate services within the communications network using the information regarding network service dynamics received from the NS/NSI modeling function. For example, the information can include predictions of network service requests or requirements, which are acted on by the NMS in advance of the requirements being received. Embodiments of the present invention provide for an NMS as described above.

Embodiments of the present invention provide for a method for creating or modifying a service in a communications network. The method includes instantiating or modifying, by a network management service (NMS), a network service/network slice instance (NS/NSI) within the communications network. This includes determining a need for a new NS/NSI or a modified NS/NSI; receiving from a NS/NSI modeling function information regarding network service dynamics for the new NS/NSI or a modified NS/NSI; and pre-allocating resources, using the information received from the NS/NSI modeling function, for creating the new NS/NSI or a modified NS/NSI.

As used herein, operations involving an NSI, such as creation modification or termination of an NSI, can in some embodiments relate to or comprise operations involving a corresponding NSSI (network slice subnet instance), which is a part of the NSI being operated on.

In some embodiments, an NSI can refer to a network slice instance (or NSSI) in a network segment. A network service may be provided by a combination of these NSIs or NSSIs. As such, a person skilled in the art really understand that a network slice instance may be prepared by combining parts of network slices from different networks and those parts also be prepared (including pre-prepared, pre-configured, or both) in the manner described herein.

As will be readily understood in view of the above, embodiments of the present invention can be used for accommodating a variety of NSR types. Some embodiments comprise timely accommodating NSRs requiring short set up times. Some embodiments comprise timely accommodating dynamic service modifications in short amounts of time. The service modifications can be customer requested or triggered in response other stimuli such as network failures or traffic loading conditions. Some embodiments comprise selecting appropriate NF instantiation locations, types of network infrastructure used to instantiate an NF, or both, for timely accommodating a NS. Some embodiments comprise supporting a timed service, by preparing the network a limited or minimum amount of time before the timed service is scheduled to be required. Some embodiments comprise accommodating an anticipated plurality of NS requests by pre-preparing faculties such as NSIs ready to be used to accommodate the NS requests as they arrive. Sufficient faculties can be pre-prepared as needed and maintained in anticipation of an expected arrival rate of NS requests of one or more types.

It will be readily understood that, throughout the preceding discussion, the above-described network functionalities and operations may correspond to a method for use in supporting operation of a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Figure 7:
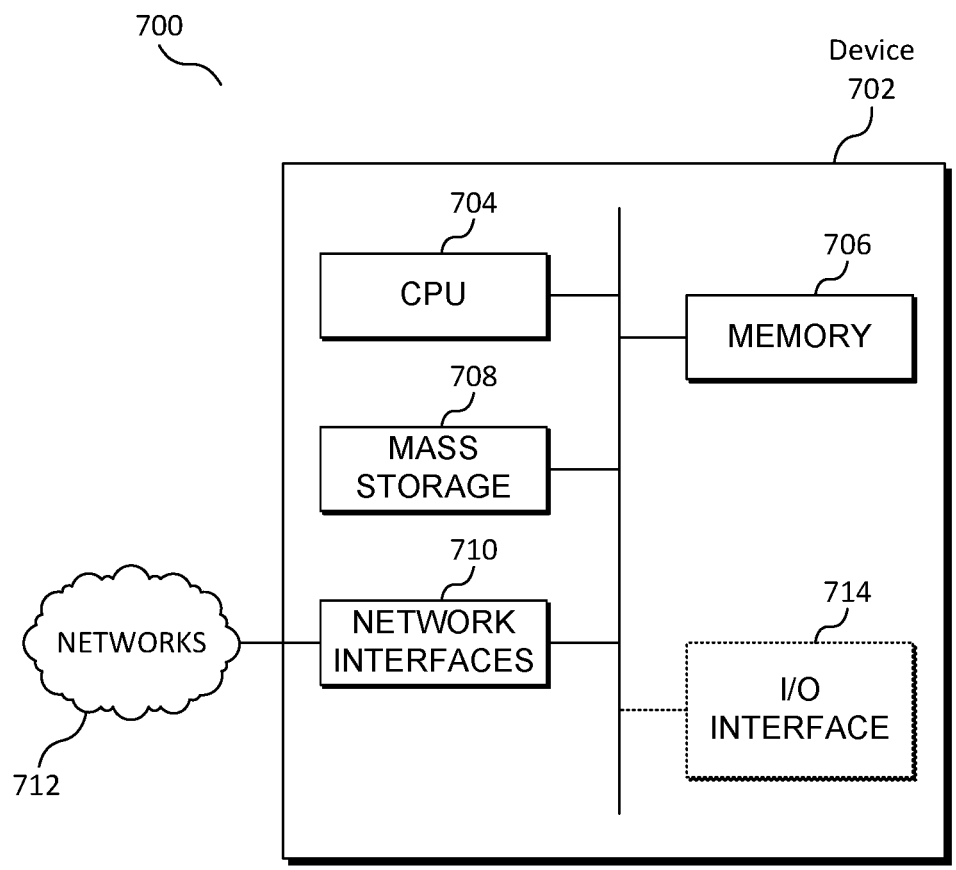
FIG. 7 illustrates an apparatus provided in accordance with embodiments of the present invention.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms, such as device 702 shown in FIG. 7, may be used to provide one or more virtual computing machines. Computer resources, which may be representative of a share of time available on a pool of processors, storage resources representative of long and short term memory availability, and connectivity resources representative of the allocation of portions of network links, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways. Within environment 700, device 702 includes a processor 704 which can be operatively connected to memory 706 and mass storage 708. Within memory 706 and mass storage 708 can be executable instructions that when executed by processor 704 cause device 702 to carry out the methods discussed. Device 702 has a network interface 710 that allows receipt of signalling from other nodes in network 712, as well as transmission of messages to such nodes. There may be optional elements such as I/O interface 714.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A modeling function operating in a communication network, the modeling function comprising a processor, a memory, and a network interface and configured to:
collect, using the network interface, input information relating to a network service;
maintain, using the processor and the memory, modeled information relating to network service dynamics, the modeled information maintained based on a computational model incorporating the input information;
predict, using the modeled information, a customer request to modify, scale, or terminate the network service and a predicted time at which the customer request will be received;

predict, using the modeled information, one or more delays associated with one or more of: instantiating; configuring; modifying; and terminating a network slice instance (NSI), the NSI being configured to provide the network service, wherein the one or more delays are determined based on particular delays associated with one or more of: creating; configuring; modifying; and terminating one or more network functions, forwarding paths, forwarding links, or a combination thereof, for instantiating, configuring, modifying or terminating the NSI; and transmit, using the network interface, a pre-preparation message to a network management service (NMS) operating in the communication network a predetermined amount of time prior to the predicted time, the predetermined amount of time being based on the one or more delays; and wherein the pre-preparation message instructs the NMS to perform one or more operations for instantiating, configuring, modifying or terminating the NSI.

2. The modeling function of claim 1, wherein the modeled information includes an indication of time delays anticipated during creation or modification of the network service.

3. The modeling function of claim 1, wherein the input information includes information carried in an initial request for the network service and used by the modeling function to initialize the computational model.

4. The modeling function of claim 1, wherein the input information includes performance indicators provided by the NMS and indicative of performance of the network service.

5. The modeling function of claim 1, wherein the input information comprises information relating to the network slice instance.

6. The modeling function of claim 1, wherein the network service dynamics comprise dynamics related to a capability, of an infrastructure of the communication network, to support one or both of: the network service; and one or more network functions supporting the network service.

7. The modeling function of claim 1, wherein one or more network functions support the network service, and wherein the input information includes an indication of network resources capable of supporting the one or more network functions, the modeling function further configured to select, from among network resources corresponding to the indication, one or more particular network resources for use in instantiating or potentially instantiating the one or more network functions.

8. The modeling function of claim 7, wherein the network resources capable of supporting the one or more network functions are determined based on requirements of the one or more network functions in comparison with nominal or determined capabilities of the network resources.

9. The modeling function of claim 8, wherein the requirements of the one or more network functions include requirements to perform one or more operations involving the network functions within a predetermined time limit, said one or more operations including some or all of: network function instantiation, network function configuration, network function activation, and network function modification, wherein said network functions are located in a same network domain or different ones of said network functions are located in different network domains.

10. The modeling function of claim 1, wherein one or more network functions (NFs) support the network service, and wherein the input information includes a classification of NFs that can be instantiated at different points of presence in the network, the classification being indicative of NF characteristics including expected amount of time taken to perform one or more of: NF instantiation, NF configuration, NF activation, NF modification, NF termination, and communication with the NF.

11. The modeling function of claim 1, wherein one or more network functions (NFs) support the network service, and wherein the input information includes one or more of: an indication of latency in instantiation of at least one of the NFs at a particular point of presence (PoP) including messaging required for the instantiation; an indication of latency in activation, modification or termination of at least one of the NFs; an indication of latency for configuration of at least one of the NFs; an indication of latency for reconfiguration of at least one of the NFs; an indication of latency in messaging delays to a particular PoP of at least one of the NFs; an indication of delays in providing required information to the NMS; and an indication of delays in taking a decision on a required action involving at least one of the NFs.

12. The modeling function of claim 1, wherein the modeled information includes an indication of a set up time for the NSI.

13. The modeling function of claim 1, wherein the input information includes network status information, said network status information including an indication of one or more of: status of pre-prepared network functions, status of pre-prepared network slice instances, and status of pre-prepared network slice subnet instances.

14. The modeling function of claim 1, further configured to mark resources currently being utilized for providing the network service as being provisionally available as of a certain time.

15. The modeling function of claim 1, further configured to predict, as part of the modeled information, a number of network slice instances (NSIs) required to be created, modified, terminated, or a combination thereof, over a specified future time period, to support predicted customer requests during the specified future time period.

16. The modeling function of claim 1, wherein the particular delays comprise a delay due to management signaling and communication between said one or more network functions and the NMS, or between said one or more network functions and other network functions, or both, in order to perform said creating; configuring; modifying; or terminating said one or more network functions.

17. A method performed by a modeling function operating in a communication network, comprising:
collecting, using a network interface of the modeling function, input information relating to a network service provided by the communication network;
maintaining modeled information relating to network service dynamics, the modeled information maintained based on a computational model incorporating the input information;
predicting, using the modeled information, a customer request to modify, scale, or terminate a network service and a predicted time at which the customer request will be received;
predicting, using the modeled information, one or more delays associated with one or more of: instantiating; configuring; modifying; and terminating a network slice instance (NSI), the NSI being configured to provide the network service, wherein the one or more delays are determined based on particular delays associated with one or more of: creating; configuring; modifying; and terminating one or more network functions, forwarding paths, forwarding links, or a combination thereof, for instantiating, configuring, modifying or terminating the NSI; and transmitting, using the network interface, a pre-preparation message to a network management service (NMS) operating in the communication network a predetermined amount of time prior to the predicted time, the predetermined amount of time being based on the one or more delays; and wherein the pre-preparation message instructs the NMS to perform one or more operations for instantiating, configuring, modifying or terminating the NSI.

18. The method of claim 17, further comprising:
receiving, at the NMS, the modeled information from the modeling function; and
directing, by the NMS, underlying resources to create, modify or terminate, or to prepare to create, modify or terminate the network service within the communications network, using the modeled information.

19. The method of claim 17, wherein one or more network functions (NFs) support the network service, and wherein the input information includes one or more of: an indication of latency in instantiation of at least one of the NFs at a particular point of presence (PoP) including messaging required for the instantiation; an indication of latency in activation, modification or termination of at least one of the NFs; an indication of latency for configuration of at least one of the NFs; an indication of latency for reconfiguration of at least one of the NFs; an indication of latency in messaging delays to a particular PoP of at least one of the NFs; an indication of delays in providing required information to the NMS; and an indication of delays in taking a decision on a required action involving at least one of the NFs.

20. The method of claim 17, wherein the modeled information includes an indication of a set up time for a specified network slice supporting the network service.

21. The method of claim 17, wherein the input information includes network status information, said network status information including an indication of one or more of: status of pre-prepared network functions, status of pre-prepared network slice instances, and status of pre-prepared network slice subnet instances.

22. The method of claim 17, further comprising marking resources currently being utilized for providing the network service as being provisionally available as of a certain time.

23. The method of claim 17, further comprising predicting, as part of the modeled information, a number of network slice instances (NSIs) required to be created, modified, terminated, or a combination thereof, over a specified future time period, to support predicted customer requests during the specified future time period.

24. The method of claim 17, wherein the particular delays comprise a delay due to management signaling and communication between said one or more network functions and the NMS, or between said one or more network functions and other network functions, or both, in order to perform said creating; configuring; modifying; or terminating said one or more network functions.

25. A system comprising:
a modeling function operating in a communication network, the modeling function comprising a processor, a memory, and a network interface and configured to:
collect, using the network interface, input information relating to a network service; maintain, using the processor and the memory, modeled information relating to network service dynamics, the modeled information maintained based on a computational model incorporating the input information;
predict, using the modeled information, a customer request to modify, scale, or terminate the network service and a predicted time at which the customer request will be received;
predict, using the modeled information, one or more delays associated with one or more of: instantiating; configuring; modifying; and terminating a network slice instance (NSI), the NSI being configured to provide the network service, wherein the one or more delays are determined based on particular delays associated with one or more of: creating; configuring; modifying; and terminating one or more network functions, forwarding paths, forwarding links, or a combination thereof, for instantiating, configuring, modifying or terminating the NSI; and
transmit, using the network interface, a pre-preparation message to a network management service (NMS) operating in the communication network a predetermined amount of time prior to the predicted time, the predetermined amount of time being based on the one or more delays; and the network management service (NMS), the NMS comprising another processor, another memory, and another network interface and configured to:
receive, using the network interface, the pre-preparation message from the modeling function; and
perform, using the other processor, the other memory and the other network interface, operations comprising one or more of: instantiating, configuring, modifying or terminating the NSI, or preparing to instantiate, configure, modify or terminate the NSI, using the modeled information in response to receiving the pre-preparation message.

26. The system of claim 25, wherein the modeling function is further configured to predict, as part of the modeled information, a number of network slice instances (NSIs) required to be created, modified, terminated, or a combination thereof, over a specified future time period, to support predicted customer requests during the specified future time period.

27. The system of claim 25, wherein the particular delays comprise a delay due to management signaling and communication between said one or more network functions and the NMS, or between said one or more network functions and other network functions, or both, in order to perform said creating; configuring; modifying; or terminating said one or more network functions.

* * * * *